United States Patent
Kim et al.

(10) Patent No.: US 10,980,018 B2
(45) Date of Patent: Apr. 13, 2021

(54) METHOD AND DEVICE FOR CONTROLLING ACCESS ON BASIS OF COMMON RESOURCE IN COMMUNICATION SYSTEM

(71) Applicant: ELECTRONICS AND TELECOMMUNICATIONS RESEARCH INSTITUTE, Daejeon (KR)

(72) Inventors: Jae Heung Kim, Daejeon (KR); Cheul Soon Kim, Daejeon (KR); Kyoung Seok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/315,696

(22) PCT Filed: Sep. 15, 2017

(86) PCT No.: PCT/KR2017/010146
§ 371 (c)(1),
(2) Date: Jan. 7, 2019

(87) PCT Pub. No.: WO2018/062735
PCT Pub. Date: Apr. 5, 2018

(65) Prior Publication Data
US 2019/0215828 A1    Jul. 11, 2019

(30) Foreign Application Priority Data

Sep. 30, 2016  (KR) .................. 10-2016-0126811
Nov. 2, 2016   (KR) .................. 10-2016-0145271
(Continued)

(51) Int. Cl.
*H04W 72/04* (2009.01)
*H04W 74/08* (2009.01)
(Continued)

(52) U.S. Cl.
CPC ....... *H04W 72/0426* (2013.01); *H04W 48/08* (2013.01); *H04W 72/04* (2013.01);
(Continued)

(58) Field of Classification Search
CPC . H04W 72/04; H04W 74/00; H04W 74/0833; H04W 72/0426; H04W 74/08; H04W 48/08
See application file for complete search history.

(56) References Cited

U.S. PATENT DOCUMENTS 8,391,206 B2   3/2013   Alexiou et al.
8,521,164 B2   8/2013   Kwack et al.
(Continued)

FOREIGN PATENT DOCUMENTS

JP   2011525783 A      9/2011
KR   10-2011-0102580 A  9/2011
(Continued)

OTHER PUBLICATIONS

Search Report, dated Dec. 22, 2017, for International Application No. PCT/KR2017/010146.
(Continued)

*Primary Examiner* — Mehmood B. Khan
(74) *Attorney, Agent, or Firm* — LRK Patent Law Firm

(57) ABSTRACT

A method and a device for controlling an access on the basis of a common resource in a communication system. An operating method of a terminal in a communication system includes: receiving configuration information of a common resource from a first base station among the plurality of base stations; receiving common information from the first base
(Continued)

station through the common resource indicated by the configuration information; and performing a random access procedure with a second base station among the plurality of base stations by using the common information. Therefore, the performance of the communication system can be improved.

13 Claims, 14 Drawing Sheets

(30) Foreign Application Priority Data

Dec. 14, 2016 (KR) .......................... 10-2016-0170264
Mar. 14, 2017 (KR) .......................... 10-2017-0032023
Apr. 25, 2017 (KR) .......................... 10-2017-0053045

(51) Int. Cl.
*H04W 48/08* (2009.01)
*H04W 74/00* (2009.01)

(52) U.S. Cl.
CPC ........... *H04W 74/00* (2013.01); *H04W 74/08* (2013.01); *H04W 74/0833* (2013.01)

(56) References Cited

U.S. PATENT DOCUMENTS

| | | | |
|---|---|---|---|
| 8,717,976 | B2 | 5/2014 | Chung et al. |
| 9,107,111 | B2 | 8/2015 | Abe et al. |
| 9,265,063 | B2 | 2/2016 | Kim et al. |
| 9,456,461 | B2 | 9/2016 | Wu |
| 9,763,151 | B2 | 9/2017 | Kim |
| 9,775,188 | B2 | 9/2017 | Kim |
| 10,499,369 | B2 * | 12/2019 | Ryu ..................... H04L 5/0007 |
| 2012/0289286 | A1* | 11/2012 | Miki ..................... H04L 5/0096 455/552.1 |
| 2014/0334446 | A1 | 11/2014 | Lim et al. |
| 2015/0312927 | A1 | 10/2015 | Ko et al. |
| 2015/0358945 | A1 | 12/2015 | Susitaival et al. |
| 2015/0365869 | A1 | 12/2015 | Gao et al. |
| 2016/0105911 | A1 | 4/2016 | Kim et al. |
| 2016/0150573 | A1 | 5/2016 | Pani et al. |
| 2016/0198406 | A1* | 7/2016 | Hoglund ............... H04W 76/28 370/311 |
| 2016/0205705 | A1 | 7/2016 | Chen |
| 2017/0086131 | A1* | 3/2017 | Gupta ............... H04W 36/0061 |
| 2017/0094547 | A1* | 3/2017 | Yum .................... H04W 56/001 |
| 2017/0105166 | A1* | 4/2017 | Lee ...................... H04W 68/005 |
| 2017/0311290 | A1* | 10/2017 | Adjakple ................ H04W 4/06 |
| 2018/0332433 | A1* | 11/2018 | Wu ........................ H04W 68/00 |
| 2019/0044782 | A1* | 2/2019 | Zeng ................. H04W 72/0413 |
| 2019/0327037 | A1* | 10/2019 | Yoshimoto .............. H04L 5/001 |

FOREIGN PATENT DOCUMENTS

| | | |
|---|---|---|
| KR | 10-2013-0100716 A | 9/2013 |
| KR | 10-2014-0071266 A | 6/2014 |
| KR | 10-2014-0071480 A | 6/2014 |
| KR | 10-2015-0005458 A | 1/2015 |
| KR | 20150005458 A | 1/2015 |
| WO | 2010008844 A1 | 1/2010 |
| WO | 2013049768 A1 | 4/2013 |
| WO | 2016182401 A1 | 11/2016 |

OTHER PUBLICATIONS

Written Opinion, dated Dec. 22, 2017, for International Application No. PCT/KR2017/010146.
Mediatek Inc., "Remaining issues for DCI format design", #GPP TSG-RAN WG1 Meeting #83, R1-157384, Anaheim, USA, Nov. 15-22, 2015.
LG Electronics, "Subframe and mini-subframe definition for frame structure of NR", 3GPP TSG RAN WG1 Meeting #86, R1-166881, Gothenburg, Sweden Aug. 22-26, 2016.
Sony, "System Information Area Scope and Value Tag", 3GPP TSG RAN WG2 Meeting #93, St. Julian's, Malta, Feb. 15-19, 2016.
ZTE, "Considerations on system information change notification", 3GPP TSG-RAN WG2 Meeting #93bis, R2-162358, Dubrovnik, Croatia, Apr. 11-15, 2016.
Ericsson, "System Information Update for NB-IoT", #GPP TSG RAN WG2 #93bis, R2-162770, Dubrovnik, Croatia, Apr. 11-15, 2016.
Sony, "System Information Area Scope and Value Tag.", 3GPP TSG RAN WG2 Meeting #93, R2-161140, St. Julian's, Malta, Feb. 15-19, 2016.
Intel Corporation, "Discussion on RAN notification area for the new RRC state", 3GPP TSG RAN WG2 Meeting #95bis, R2-166881, Kaohsiung, Oct. 10-14, 2016.

* cited by examiner

METHOD AND DEVICE FOR CONTROLLING ACCESS ON BASIS OF COMMON RESOURCE IN COMMUNICATION SYSTEM

CROSS-REFERENCE TO RELATED APPLICATIONS

The present application is a U.S. National Phase entry from International Application No. PCT/KR2017/010146, filed Sep. 15, 2017, which claims priority to Korean Patent Application Nos. 10-2016-0126811, filed Sep. 30, 2016, 10-2016-0145271, filed Nov. 2, 2016, 10-2016-0170264, filed Dec. 14, 2016, 10-2017-0032023, filed Mar. 14, 2017, 10-2017-0053045, filed Apr. 25, 2017, the disclosures of which are incorporated by reference herein in their entirety.

BACKGROUND

1. Field of the Invention

The present invention relates to access control techniques in a communication system, and more particularly, to techniques for controlling accesses for minimizing unnecessary system information acquisition procedures.

2. Description of Related Art

A communication system (hereinafter, an 'integrated communication system') using a higher frequency band (e.g., a frequency band of 6 GHz or higher) than a frequency band (e.g., a frequency band lower below 6 GHz) of a long term evolution (LTE) based communication system (or, a LTE-A based communication system) is being considered for processing of soaring wireless data. The reception performance of a signal may deteriorate due to path loss of a radio wave and reflection of the radio wave in such the high frequency band (e.g., a frequency band of 6 GHz or higher), and a small base station supporting smaller cell coverage than that of a macro base station can be introduced into the integrated communication system in order to solve this problem. In the integrated communication system, the small base station may be connected to a core network using a wired backhaul link.

Meanwhile, the integrated communication system may comprise the small base station performing all the functions of a communication protocol (e.g., a remote radio transmission and reception function, a baseband processing function), a plurality of transmission reception points (TRPs) performing the remote radio transmission and reception function among the functions of the communication protocol, a baseband unit (BBU) block performing the baseband processing function among the functions of the communication protocol, and the like. The TRP may be a remote radio head (RRH), a radio unit (RU), or the like. The BBU block may include at least one BBU or at least one digital unit (DU). The BBU block may be referred to as a 'BBU pool', a 'centralized BBU', or the like. One BBU block may be connected to a plurality of TRPs, and perform the baseband processing function on signals received from the plurality of TRPs and signals to be transmitted to the plurality of TRPs.

In the communication systems described above, when there are a plurality of base stations, each of the plurality of base stations may transmit system information. The terminal may perform an access procedure using the system information received from each of the plurality of base stations. A part of the system information may be common in the plurality of base stations. However, even when common system information exists, the terminal should perform a procedure of acquiring the entire system information of the base station for the access procedure, and thus the overhead due to the procedure may increase.

SUMMARY

In order to solve the above-described problem, the present invention is directed to providing a method and an apparatus for controlling accesses for minimizing unnecessary system information acquisition procedures in a communication system.

An operation method performed by terminal in a communication system including a plurality of base stations, according to a first embodiment of the present invention for achieving the above-described objective, may comprise receiving configuration information of a common resource from a first base station among the plurality of base stations; receiving common information from the first base station through the common resource indicated by the configuration information; and performing a random access procedure with a second base station among the plurality of base stations by using the common information, wherein the common resource and the common information are configured equally for the plurality of base stations.

Here, the random access procedure may be performed without performing a procedure of acquiring system information of the second base station.

Here, the random access procedure may be performed using a resource indicated by the common information.

Here, the performing a random access procedure may comprise transmitting a message requesting other system information of the second base station to the second base station; and receiving the other system information from the second base station, wherein the other system information is system information excluding system information included in the common information among entire system information of the second base station.

Here, the message may be a random access preamble, and the other system information may be acquired through a random access response.

Here, the common information may include at least one of system information, control information, physical channel information, reference signal information, and resource allocation information configured equally in the plurality of base stations.

Here, the common information may include a service area (SA) identifier indicating a service area to which the common information is applied, and the second base station may belong to the service area indicated by the SA identifier.

Here, the common resource may be configured independently according to a type of resource allocation information included in the common information, and the resource allocation information may include at least one of resource allocation information for a control channel, resource allocation information for the random access procedure, resource allocation information for a scheduling request, and resource allocation information for a downlink transmission request.

An operation method of a first base station among a plurality of base stations included in a communication system, according to a second embodiment of the present invention for achieving the above-described objective, may comprise transmitting configuration information of a common resource configured equally for the plurality of base stations; transmitting common information configured equally for the plurality of base stations through the common resource indicated by the configuration information; and performing a random access procedure with a terminal based on the common information.

Here, the random access procedure may be performed without performing a procedure of transmitting system information of the first base station.

Here, the terminal may be in a state in which a connection procedure with the second base station among the plurality of base station has been completed.

Here, the performing a random access procedure may comprise receiving from the terminal a message requesting other system information of the first base station; and transmitting the other system information to the terminal in response to the message, wherein the other system information is system information excluding system information included in the common information among entire system information of the first base station.

Here, the common information may include at least one of system information, control information, physical channel information, reference signal information, and resource allocation information configured equally in the plurality of base stations, and a service area (SA) identifier indicating a service area to which the common information is applied.

Here, the common resource may be configured independently according to a type of resource allocation information included in the common information, and the resource allocation information may include at least one of resource allocation information for a control channel, resource allocation information for the random access procedure, resource allocation information for a scheduling request, and resource allocation information for a downlink transmission request.

A terminal in a communication system including a plurality of base stations, according to a third embodiment of the present invention for achieving the above-described objective, may comprise a processor and a memory storing at least one instruction executed by the processor, and the at least one instruction may be configured to receive configuration information of a common resource from a first base station among the plurality of base stations; receive common information from the first base station through the common resource indicated by the configuration information; and perform a random access procedure with a second base station among the plurality of base stations by using the common information, wherein the common resource and the common information are configured equally for the plurality of base stations.

Here, the random access procedure may be performed without performing a procedure of acquiring system information of the second base station.

Here, the at least one instruction may be further configured to, when the random access procedure is performed, transmit a message requesting other system information of the second base station to the second base station; and receive the other system information from the second base station, wherein the other system information is system information excluding system information included in the common information among entire system information of the second base station.

Here, the common information may include at least one of system information, control information, physical channel information, reference signal information, and resource allocation information configured equally in the plurality of base stations.

Here, the common information may include a service area (SA) identifier indicating a service area to which the common information is applied, and the second base station may belong to the service area indicated by the SA identifier.

Here, the common resource may be configured independently according to a type of resource allocation information included in the common information, and the resource allocation information may include at least one of resource allocation information for a control channel, resource allocation information for the random access procedure, resource allocation information for a scheduling request, and resource allocation information for a downlink transmission request.

Advantageous Effects

According to the present invention, when system information (e.g., common information) of the first base station is acquired, the terminal may perform an access procedure with the second base station by using the system information of the first base station without performing a procedure of acquiring system information of the second base station. Also, the terminal may receive minimum system information from the base station, may transmit to the base station a message requesting transmission of other system information when system information other than the minimum system information (e.g., additional system information) is required, and may receive the other system information from the base station. Therefore, procedures of acquiring unnecessary system information can be minimized, and the performance of the communication system can be improved.

DETAILED DESCRIPTION OF THE INVENTION

Figure 1:
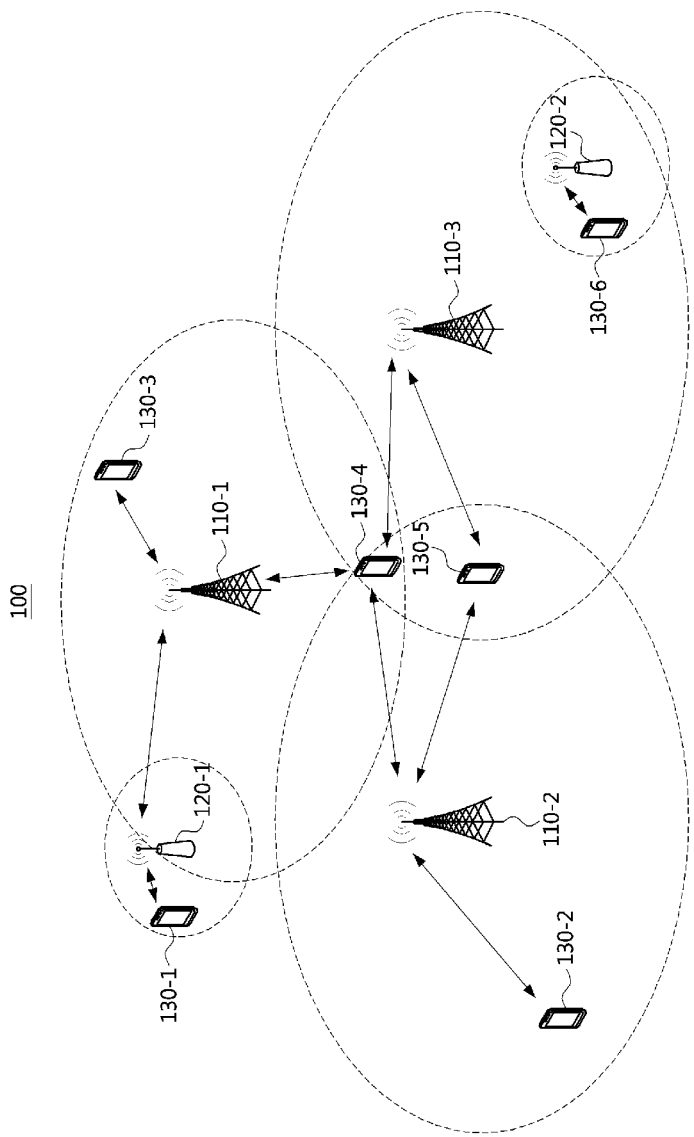
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Hereinafter, a communication system to which embodiments according to the present disclosure will be described. However, the communication systems to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support 4th generation (4G) communication (e.g., long term evolution (LTE), LTE-advanced (LTE-A)), 5th generation (5G) communication, or the like. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a cyclic prefix OFDM (CP-OFDM) based communication protocol, a discrete Fourier transform spread OFDM (DFT-s-OFDM) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, a communication protocol based on a radio access technology (RAT) capable of multiple accesses according to a beamforming scheme using a massive antenna, or the like. Each of the plurality of communication nodes may have the following structure.

Figure 2:
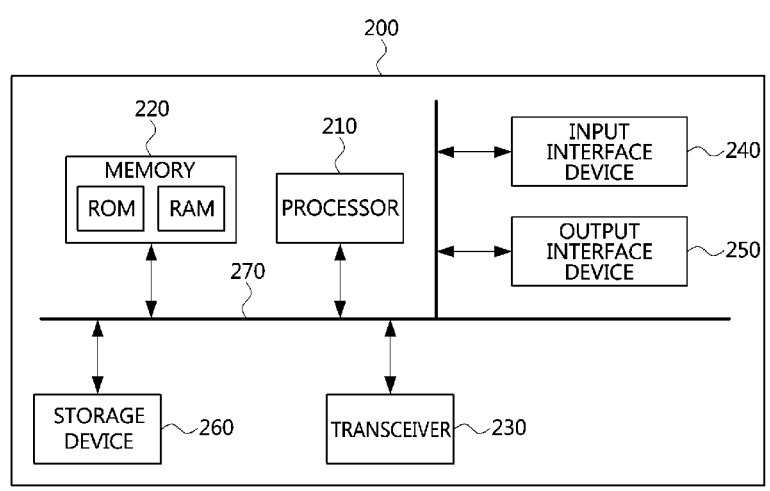
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 comprising the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may be referred to as an advanced base station (ABS), a high reliability-base station (HR-BS), a Node B (NodeB), an evolved Node B (eNodeB), a gNB, a base transceiver station (BTS), a radio base station, a radio transceiver, an access point (AP)), an access node, a radio access station (RAS), a mobile multihop relay-base station (MMR-BS), a relay station (RS), an advanced relay station (ARS), a high reliability-relay station (HR-RS), a small base station, a femto base station, a pico base station, a macro base station, a micro base station, a home NodeB (HNB), a home eNodeB (HeNB), a road side unit (RSU), a radio remote head (RRH), a transmission point (TP), a transmission and reception point (TRP), or the like. Also, each of the plurality of base stations 110-1, 110-2, 110-3, 120-1, and 120-2 can perform all or a part of functions of the above-described entities (e.g., ABS, NodeB, eNodeB, AP, RAS, BTS, MMR-BS, RS, RN, ARS, HR-RS, small base station, RSU, RRH, TP, TRP, etc.).

Each of the plurality of terminals 130-1, 130-2, 130-3, 130-4, 130-5, and 130-6 may be referred to as a user equipment (UE), a terminal equipment (TE), a mobile terminal (MT), a mobile station, an advanced mobile station (AMS), a high reliability-mobile station (HR-MS), a subscriber station (SS), a portable subscriber station (PSS), an access terminal (AT), a device, a station, an Internet of Things (IoT) device, a mounted module, an on board unit (OBU), or the like. Also, each of the plurality of terminals 130-1, 130-2, 130-3, 130-4, 130-5, and 130-6 can perform all or a part of functions of the above-described entities (e.g., MT, MS, AMS, HR-MS, SS, PSS, AT, UE, IoT device, mounted module, etc.).

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in a communication system, a base station may perform all functions (e.g., remote radio transmission and reception function, baseband processing function, and the like) according to a communication protocol. Alternatively, the remote radio transmission and reception function among all the functions according to the communication protocol may be performed by a transmission reception point (TRP), and the baseband processing function among all the functions according to the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a function-split technique of the communication protocol is applied, the TRP may selectively perform some functions of the BBU or some functions of a MAC/RLC layer.

Figure 3:
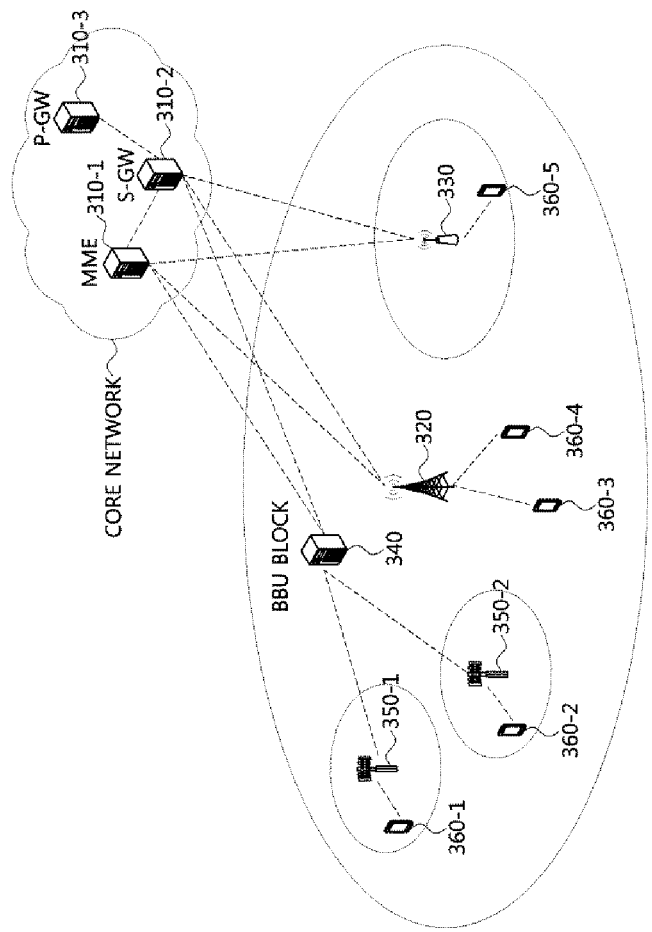
FIG. 3 is a conceptual diagram illustrating a second embodiment of a communication system.

FIG. 3 is a conceptual diagram illustrating a second embodiment of a communication system.

Referring to FIG. 3, a communication system may include a core network and an access network. The core network may include an MME 310-1, an S-GW 310-2, a P-GW 310-3, and the like. The access network may include a macro base station 320, a small base station 330, TRPs 350-1 and 350-2, terminals 360-1, 360-2, 360-3, 360-4, and 360-5, and the like. The TRPs 350-1 and 350-2 may support the remote radio transmission and reception function among all the functions according to the communication protocol, and the baseband processing functions for the TRPs 350-1 and 350-2 may be performed by the BBU block 340. The BBU block 340 may belong to the access network or the core network. The communication nodes (e.g., MME, S-GW, P-GW, macro base station, small base station, TRPs, terminals, and BBU block) belonging to the communication system may be configured identically or similarly to the communication node 200 shown in FIG. 2.

The macro base station 320 may be connected to the core network (e.g., MME 310-1, S-GW 310-2) using a wired backhaul link or a wireless backhaul link, and provide communication services to the terminals 360-3 and 360-4 based on a communication protocol (e.g., 4G communication protocol, 5G communication protocol). The small base station 330 may be connected to the core network (e.g., MME 310-1, S-GW 310-2) using a wired backhaul link or a wireless backhaul link, and may provide communication services to the terminal 360-5 based on a communication protocol (e.g., 4G communication protocol, 5G communication protocol).

The BBU block 340 may be located in the MME 310-1, the S-GW 310-2, or the macro base station 320. Alternatively, the BBU block 340 may be located independently of each the MME 310-1, the S-GW 310-2, and the macro base station 320. For example, the BBU block 340 may be configured as a logical function between the macro base station 320 and the MME 310-1 (or S-GW 310-2). The BBU block 340 may support the plurality of TRPs 350-1 and 350-2, and may be connected to each of the plurality of TRPs 350-1 and 350-2 using a wired fronthaul link or a wireless fronthaul link. That is, the link between the BBU block 340 and the TRPs 350-1 and 350-2 may be referred to as a 'fronthaul link'.

The first TRP 350-1 may be connected to the BBU block 340 via a wired fronthaul link or a wireless fronthaul link, and provide communication services to the first terminal 360-1 based on a communication protocol (e.g., 4G communication protocol, 5G communication protocol). The second TRP 350-2 may be connected to the BBU block 340 via a wired fronthaul link or a wireless fronthaul link, and provide communication services to the second terminal 360-2 based on a communication protocol (e.g., 4G communication protocol, 5G communication protocol).

Meanwhile, in the embodiments to be described below, a communication system including an access network, an Xhaul network, and a core network may be referred to as an 'integrated communication system'. The communication nodes (e.g., MME, S-GW, P-GW, BBU block, Xhaul distributed unit (XDU), Xhaul control unit (XCU), base station, TRP, terminal, and the like) may be configured identically or similarly to the communication node 200 shown in FIG. 2. The communication nodes belonging to the Xhaul network may be connected using an Xhaul link, and the Xhaul link may be a backhaul link or a fronthaul link.

Also, the S-GW of the integrated communication system may refer to an end communication node of the core network that exchanges packets (e.g., control information, data) with the base station, and the MME of the integrated communication system may refer to a communication node in the core network that performs control functions for a wireless access section (or, interface) of the terminal. Here, each of the backhaul link, the fronthaul link, the Xhaul link, the XDU, the XCU, the BBU block, the S-GW, and the MME may be referred to as a different term according to a function (e.g., function of the Xhaul network, function of the core network) of a communication protocol depending on a radio access technology (RAT).

Figure 4:
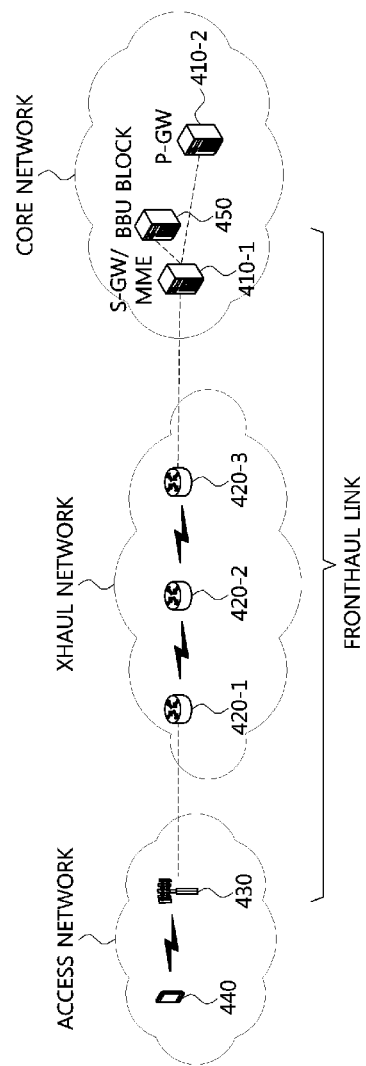
FIG. 4 is a conceptual diagram illustrating a first embodiment of an integrated communication system.

FIG. 4 is a conceptual diagram illustrating a first embodiment of an integrated communication system.

Referring to FIG. 4, the integrated communications system may include an access network, an Xhaul network, and a core network. The Xhaul network may be located between the access network and the core network, and may support communications between the access network and the core network. The communication nodes belonging to the integrated communication system may be configured to be the same as or similar to the communication node 200 shown in FIG. 2. The access network may include a TRP 430, a terminal 440, and the like. The Xhaul network may include a plurality of communication nodes 420-1, 420-2, and 420-3. The communication node constituting the Xhaul network may be referred to as an 'XDU'. In the Xhaul network, the XDUs 420-1, 420-2, and 420-3 may be connected using wireless Xhaul links and may be connected based on a multi-hop scheme. The core network may include an S-GW/MME 410-1, a P-GW 410-2, and the like. The S-GW/MME 410-1 may refer to a communication node including an S-GW and an MME. The BBU block 450 may be located in the S-GW/MME 410-1 and may be connected to the third XDU 420-3 via a wired link.

The first XDU 420-1 of the Xhaul network may be connected to the TRP 430 using a wired link. Alternatively, the first XDU 420-1 may be integrated into the TRP 430. The second XDU 420-2 may be connected to each of the first XDU 420-1 and the third XDU 420-3 using a wireless link (e.g., wireless Xhaul link), and the third XDU 420-3 may be connected to an end communication node (e.g., the S-GW/MME 410-1) of the core network using a wired link. Among the plurality of XDUs 420-1, 420-2, and 420-3 of the Xhaul network, an XDU connected to an end communication node of the core network may be referred to as an 'XDU aggregator'. That is, the third XDU 420-3 in the Xhaul network may be the XDU aggregator. The functions of the XDU aggregator may be performed by the S-GW/MME 410-1 in the core network.

The communications between the plurality of XDUs 420-1, 420-2 and 420-3 may be performed using a communication protocol for the Xhaul link (hereinafter, 'Xhaul protocol'), which is different from an access protocol (e.g., a communication protocol used for communications between the terminal 440 and the TRP 430 (or, macro base station, small base station)). Packets to which the Xhaul protocol is applied may be transmitted to each of the core network and the access network through the Xhaul link. Here, the packets may indicate control information, data, and the like. The TRP 430 may provide communication services to the terminal 440 using an access protocol (e.g., 4G communication protocol, 5G communication protocol), and may be connected to the first XDU 420-1 using a wired link. The TRP 430 may support a remote radio transmission and reception function among all the functions according to the communication protocol, and the baseband processing function for the TRP 430 may be performed in the BBU block 450. A link (e.g., "TRP 430—first XDU 420-1—second XDU 420-2—third XDU 420-3—BBU block 450 (or, SGW/MME 410-1)") between the TRP 430 performing the remote radio transmission and reception function and the BBU block 450 performing the baseband processing function may be referred to as a 'fronthaul link'. For example, the fronthaul link may be configured differently depending on the location of the BBU block 450 performing the baseband processing function.

Figure 5:
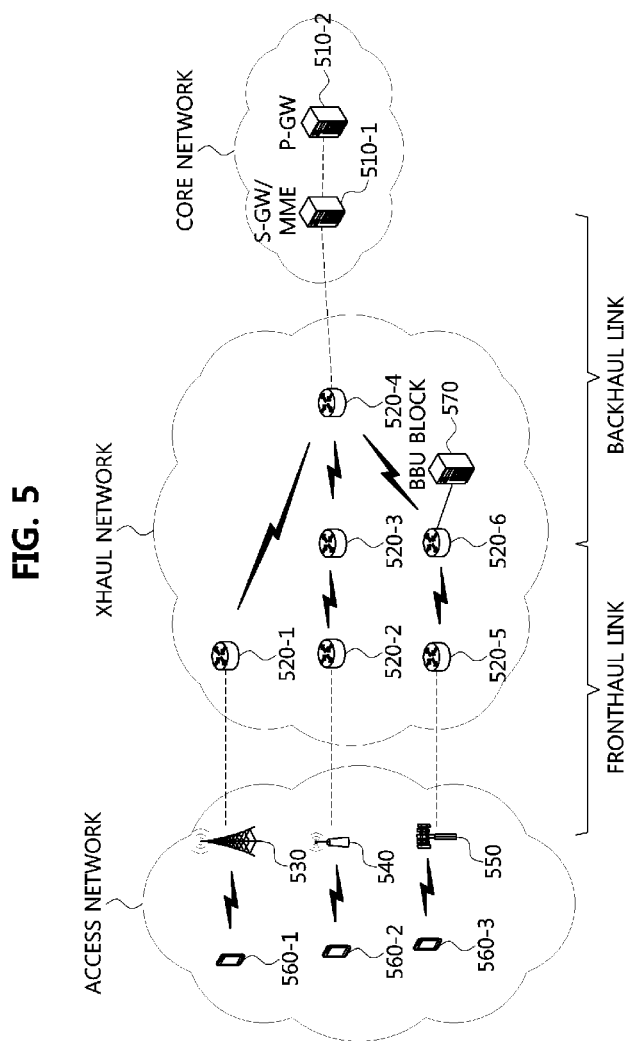
FIG. 5 is a conceptual diagram illustrating a second embodiment of an integrated communication system.

FIG. 5 is a conceptual diagram illustrating a second embodiment of an integrated communication system.

Referring to FIG. 5, the integrated communications system may include an access network, an Xhaul network, and a core network. The Xhaul network may be located between the access network and the core network, and may support communications between the access network and the core network. The communication nodes belonging to the integrated communication system may be configured to be the same as or similar to the communication node 200 shown in FIG. 2. The access network may include a macro base station 530, a small base station 540, a TRP 550, terminals 560-1, 560-2, and 560-3, and the like. The Xhaul network may include a plurality of communication nodes 520-1, 520-2, 520-3, 520-4, 520-5, and 520-6. The communication node constituting the Xhaul network may be referred to as an 'XDU'. In the Xhaul network, the XDUs 520-1, 520-2, 520-3, 520-4, 520-5, and 520-6 may be connected using wireless Xhaul links and may be connected based on a multi-hop scheme. A BBU block 570 may be located in one XDU among the plurality of XDUs 520-1, 520-2, 520-3, 520-4, 520-5, and 520-6. For example, the BBU block 570 may be located in the sixth XDU 520-6. The core network may include an S-GW/MME 510-1, a P-GW 510-2, and the like. The S-GW/MME 510-1 may refer to a communication node including an S-GW and an MME.

The first XDU 520-1 of the Xhaul network may be connected to the macro base station 530 using a wired link, or may be integrated into the macro base station 530. The second XDU 520-2 of the Xhaul network may be connected to the small base station 540 using a wired link, or may be integrated into the small base station 540. The fifth XDU 520-5 of the Xhaul network may be connected to the TRP 550 using a wired link, or may be integrated into the TRP 550.

The fourth XDU 520-4 may be connected to an end communication node (e.g., the S-GW/MME 510-1) of the core network using a wired link. Among the plurality of XDUs 520-1, 520-2, 520-3, 520-4, 520-5, and 520-6, an XDU connected to an end communication node of the core network may be referred to as an 'XDU aggregator'. That is, the fourth XDU 520-4 may be the XDU aggregator. The communications between the plurality of XDUs 520-1, 520-2, 520-3, 520-4, 520-5, and 520-6 may be performed using the Xhaul protocol. Packets (e.g., data, control information) to which the Xhaul protocol is applied may be transmitted to each of the core network and the access network via the Xhaul link.

The macro base station 530 may provide communication services to the first terminal 560-1 using an access protocol (e.g., 4G communication protocol, 5G communication protocol), and may be connected to the first XDU 520-1 via a wired link. The macro base station 530 may be connected to the core network via the Xhaul network, and a link of "macro base station 530—first XDU 520-1—fourth XDU 540-4—S-GW/MME 510-1" may be referred to as a 'backhaul link'. The small base station 540 may provide communication services to the second terminal 560-2 using an access protocol (e.g., 4G communication protocol, 5G communication protocol), and may be connected to the second XDU 520-2 using a wired link. The small base station 540 may be connected to the core network via the Xhaul network, and a link of "small base station 540—second XDU 520-2—third XDU 540-3—fourth XDU 540-4—S-GW/MME 510-1" may be referred to as a 'backhaul link'.

The TRP 550 may provide communication services to the third terminal 560-3 using an access protocol (e.g., 4G communication protocol, 5G communication protocol), and may be connected to the fifth XDU 520-5 using a wired link. The TRP 550 may support a remote radio transmission and reception function among all the functions according to the communication protocol, and the baseband processing function for the TRP 550 may be performed in the BBU block 570. A link (e.g., a link of "TRP 550—fifth XDU 520-5—BBU block 570 (or, sixth XDU 520-6)") between the TRP 550 performing the remote radio transmission and reception function and the BBU block 570 performing the baseband processing function may be referred to as a 'fronthaul link', and a link (e.g., a link of "BBU block 570 (or, sixth XDU 520-6)—fourth XDU 520-4—S-GW/MME 510-1") between the BBU block 570 and the S-GW/MME 510-1 may be referred to as a 'backhaul link'. For example, the fronthaul link may be configured differently depending on the location of the BBU block 570 performing the baseband processing function.

Next, access control methods for minimizing system information acquisition procedures in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 6:
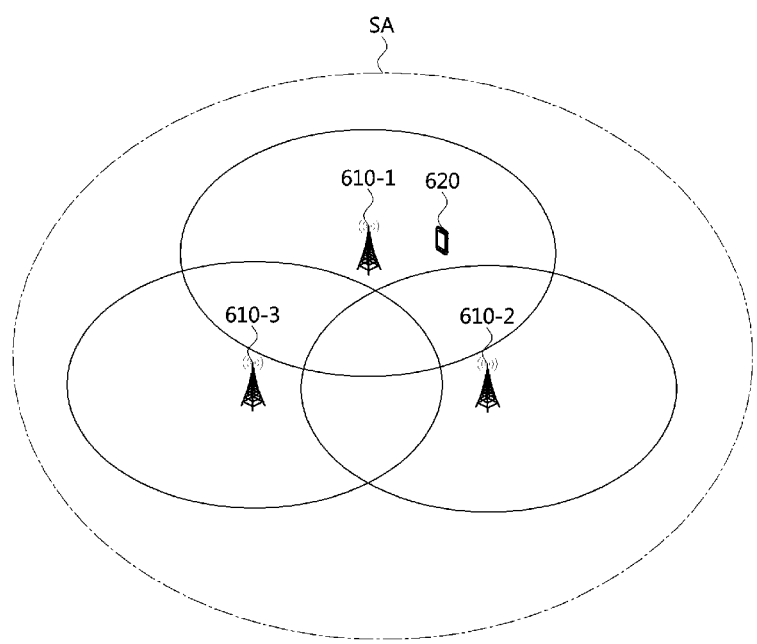
FIG. 6 is a conceptual diagram illustrating a third embodiment of a communication system.

FIG. 6 is a conceptual diagram illustrating a third embodiment of a communication system.

Referring to FIG. 6, a communication system may comprise a first base station 610-1, a second base station 610-2, a third base station 610-3, a terminal 620, and the like. The communication system of FIG. 6 may belong to the communication system 100 of FIG. 1, the communication system of FIG. 3, the integrated communication system of FIG. 4, or the integrated communication system of FIG. 5. For example, the embodiments described below may be applied to a macro base station, the small base station, the TRP, the XDU, the terminal, and the like of the integrated communication system. The base stations 610-1, 610-2, and 610-3 and the terminal may be configured to be the same as the communication node 200 shown in FIG. 2.

The communication system may have a plurality of service areas (SAs), and a control entity (e.g., MME, S-GW, or P-GW) of the communication system may manage or control each of the plurality of SAs. The base stations 610-1, 610-2, 610-3 (e.g., cell coverage of the base stations 610-1, 610-2, and 610-3) may belong to one service area, and cell coverages of the base stations 610-1, 610-2, and 610-3 may overlap with each other. For example, the base stations 610-1, 610-2, and 610-3 may be located in a specific area (e.g., an intersection, a junction point of a road, a branch point of a road, etc.). The base stations 610-1, 610-2, and 610-3 may be interconnected via a wired interface (e.g., X2 interface) or a wireless interface. The terminal 620 may have mobility. For example, terminal 620 may move in the cell coverage of each of the base stations 610-1, 610-2, and 610-3.

When the plurality of base stations 610-1, 610-2 and 610-3 are located in a specific area (e.g., service area), for efficient controls on the terminal located in the specific area (e.g., service area) and performance improvement of the communication system, a common resource and common information for the plurality of base stations 610-1, 610-2, and 610-3 may be configured. Here, the service area may be an entire area or a partial area of the communication system. The common resource and common information may be configured equally and shared by the plurality of base stations 610-1, 610-2, and 610-3 belonging to one service area. The common resource and common information may be configured by a control entity of the communication system, in which case the control entity of the communication system may inform the common resource and common information to the plurality of base stations 610-1, 610-2, and 610-3.

Alternatively, the common resource and common information may be configured through a negotiation procedure between the plurality of base stations 610-1, 610-2, and 610-3. For example, the plurality of base stations 610-1, 610-2, and 610-3 may perform the negotiation procedure for configuring the common resource and common information using a wired interface or a wireless interface. In this case, the plurality of base stations 610-1, 610-2, and 610-3 may exchange terminal-related information (e.g., density, movement path, movement speed, or the like) related to terminals belonging to the cell coverage with each other, and determine the size of the common resource based on the terminal-related information. The procedure for determining the size of the common resource may be performed at a preconfigured time or aperiodically (e.g., when a preconfigured event occurs). For example, when a preconfigured event occurs, the plurality of base stations 610-1, 610-2, and 610-3 may start the procedure for determining the size of the common resource. Alternatively, when a preconfigured event occurs, the terminal 620 may request the plurality of base stations 610-1, 610-2, and 610-3 to perform the procedure of determining the size of the common resource.

The common information may indicate the same information used in the plurality of base stations 610-1, 610-2, and 610-3, and the common information may be transmitted through the common resource. The common information may include system information, control information, physical channel configuration/allocation information, reference signal configuration/allocation information, resource allocation information, and the like. Also, the common information may further include an SA identifier indicating a service area to which the common information is applied, a duration indicator indicating a valid duration during which the common information is effectively used, and the like. For example, the common information including the SA identifier may be equally applied to a plurality of base stations belonging to a service area to which the same SA identifier is applied. Therefore, even when the base station (e.g., the cell coverage of the base station to which the terminal 620 belongs) changes according to the movement of the terminal 620, in the corresponding service area to which the same SA identifier is applied, the terminal 620 may use the already stored common information instead of newly acquiring the common information (e.g., system information, and configuration/allocation information of physical channels such as a random access resource) described above. However, if another SA identifier is applied to a new base station (or cell), the terminal 620 may perform a procedure for newly acquiring common information.

In the case that the common information is applied to the entire area of the communication system, the SA identifier and the duration indicator may be omitted from the common information. Here, the terminal 620 may determine whether the common information is to be used for communications (e.g., random access procedure, cell selection procedure, cell reselection procedure, or the like) with the corresponding base station (e.g., the first base station 610-1, the second base station 610-2, or the third base station 610-1) based on the SA identifier and the duration indicator included in the common information. Alternatively, the common information may be masked based on a specific code sequence to indicate a service area to which the common information is applied, and may include a reference signal having a specific pattern to indicate a service area to which the common information is applied.

The resource allocation information may include downlink resource allocation information and uplink resource allocation information. For example, the resource allocation information may include resource allocation information for a control channel, resource allocation information for a random access procedure, resource allocation information for a scheduling request procedure (e.g., a resource request procedure), resource allocation information for a downlink transmission request, resource allocation information for D2D communications (e.g., a resource pool for discovery procedures, a resource pool for data transmission and reception procedures, resource allocation information for control signal transmission and reception procedures), or the like.

The resource allocation information may include a center frequency, a system bandwidth, a subcarrier index, or the like as a parameter used for indicating a frequency resource. Also, the resource allocation information may include a radio frame index (e.g., a system frame number (SFN)), a subframe index, a transmission time index (TTI), a slot index, a mini-slot index, a symbol index, transmission and reception time related information (e.g., period, interval, window), or the like. Here, the index may indicate a number. Also, the resource allocation information may include a resource hopping pattern, beamforming related information (e.g., beam configuration information, beam index), a code sequence (e.g., bit sequence, signal sequence), or the like.

Meanwhile, the common resource through which the common information is transmitted may be configured as follows.

Figure 7:
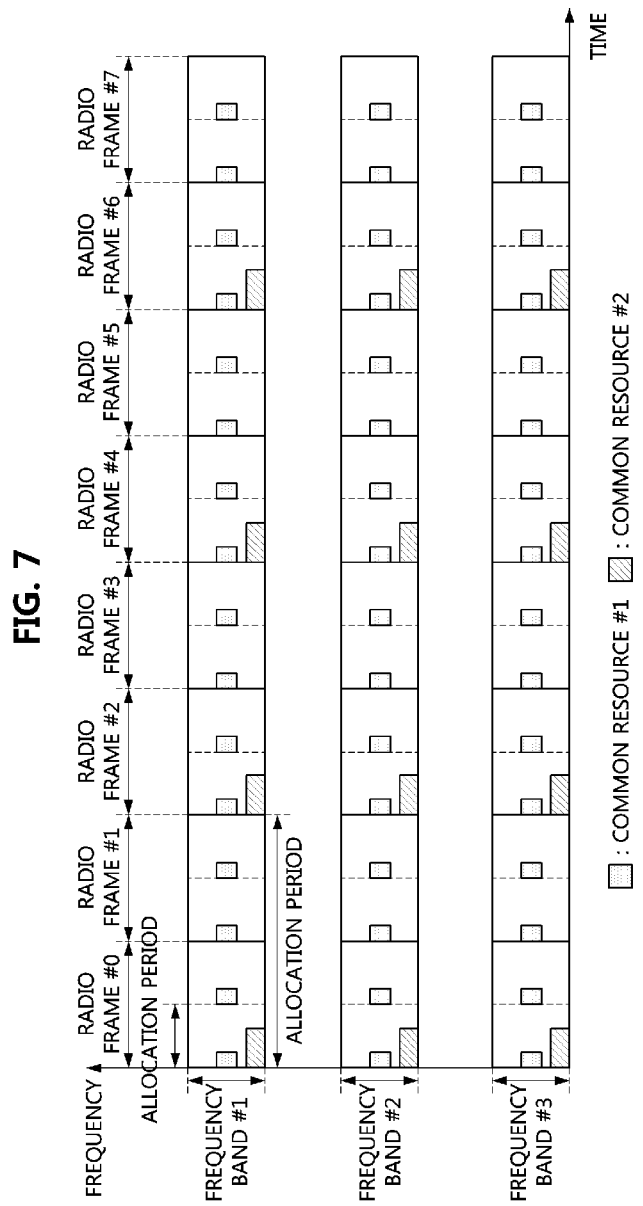
FIG. 7 is a conceptual diagram illustrating a first embodiment of a common resource in a communication system.

FIG. 7 is a conceptual diagram illustrating a first embodiment of a common resource in a communication system.

Referring to FIG. 7, a frequency band #1 may be allocated to the first base station 610-1 of FIG. 6, a frequency band #2 may be allocated to the second base station 610-2 of FIG. 6, and a frequency band #3 may be allocated to the third base station 610-3 of FIG. 6. The plurality of base stations 610-1, 610-2, and 610-3 may perform communications using the allocated frequency bands. At least one of a common resource #1 and a common resource #2 may be used for transmission of the common information, and an allocation pattern (e.g., allocated frequency resources, allocated time resources, allocation period, etc.) of each of the common resource #1 and the common resource #2 may be configured variously.

For example, the location of the common resource #1 in the frequency axis may be a central region of the frequency band allocated to each of the plurality of base stations 610-1, 610-2, and 610-3, and the location of the common resource #2 in the frequency axis may be an edge region of the frequency band allocated to each of the plurality of base stations 610-1, 610-2, and 610-3. When a radio frame includes 10 subframes, the common resource #1 may be allocated every 5 subframes in the time axis, and the common resource #2 may be allocated every 20 subframes (e.g., 2 radio frames) in the time axis.

In this case, the plurality of base stations 610-1, 610-2, and 610-3 may transmit the common information using the common resources configured in different frequency bands. However, the locations of the common resources in the time axis may be the same in the frequency bands #0 to #3. For example, the first base station 610-1 may transmit the common information using at least one of the common resource #1 and the common resource #2 configured in the frequency band #1, the second base station 610-2 may transmit the common information using at least one of the common resource #1 and the common resource #2 configured in the frequency band #2, and the third base station 610-3 may transmit the common information using at least one of the common resource #1 and the common resource #2 configured in the frequency band #3. Also, each of the common resource #1 and the common resource #2 may be used for downlink transmission, uplink transmission, sidelink transmission, or the like.

Figure 8:
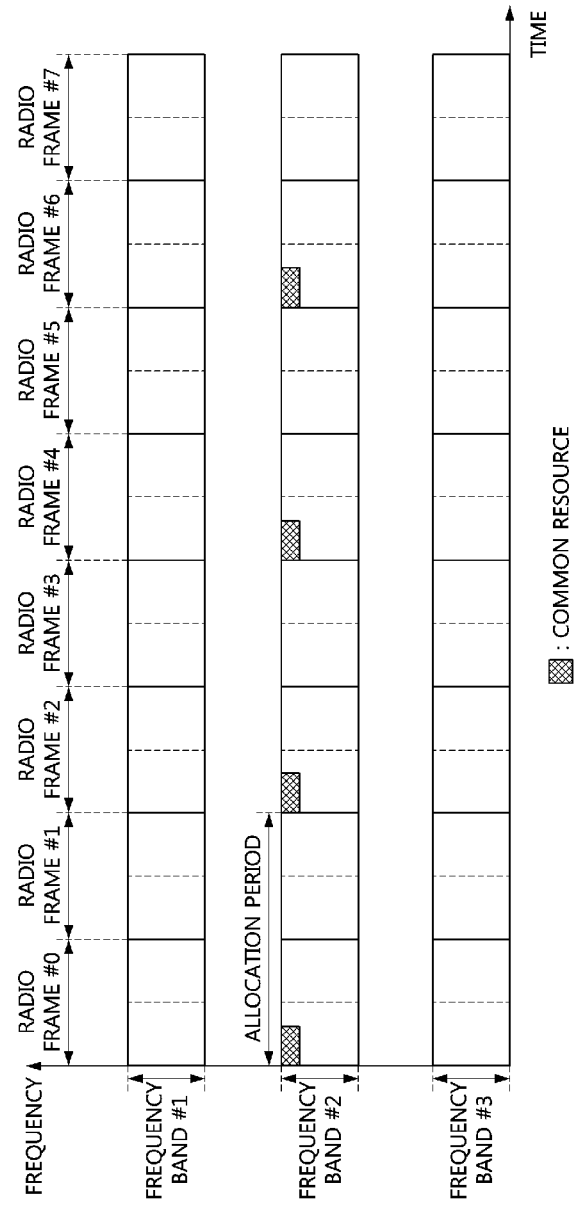
FIG. 8 is a conceptual diagram illustrating a second embodiment of a common resource in a communication system.

FIG. 8 is a conceptual diagram illustrating a second embodiment of a common resource in a communication system.

Referring to FIG. 8, a frequency band #1 may be allocated to the first base station 610-1 of FIG. 6, a frequency band #2 may be allocated to the second base station 610-2 of FIG. 6, and a frequency band #3 may be allocated to the third base station 610-3 of FIG. 6. The plurality of base stations 610-1, 610-2, and 610-3 may perform communications using the allocated frequency bands. A common resource used for transmission of the common information may be configured in the frequency band #2. For example, the location of the common resource in the frequency axis may be an edge region of frequency band #2. When a radio frame includes 10 subframes, the common resource may be allocated every 20 subframes (e.g., 2 radio frames) in the time axis. In this case, the plurality of base stations 610-1, 610-2, and 610-3 may transmit the common information using the same common resource (e.g., the common resource configured in the frequency band #2). Also, the common resource may be used for downlink transmission, uplink transmission, side link transmission, or the like.

The configuration information of the common resource shown in FIGS. 7 and 8 may include an allocation pattern (e.g., allocated frequency resources, allocated time resources, allocation period, etc.). The allocation period of the common resource may be configured to a multiple of the minimum period of the scheduling (e.g., resource allocation) specified in the communication system or an absolute time. For example, when the minimum period of the scheduling is one symbol, the allocation period of the common resource may be configured to a multiple of the symbol, and when the minimum period of the scheduling is one TTI, the allocation period of the common resource may be configured to a multiple of the TTI. Alternatively, the allocation period of the common resource may be configured to microseconds, milliseconds, seconds, minutes, etc., which are absolute time units. The plurality of base stations 610-1, 610-2, and 610-3 may inform the terminal 620 of the configuration information of the common resource through a system information transmission procedure or a separate control information signaling procedure. Herein, the signaling procedure may mean a procedure for transmitting control information using a dedicated control message of an RRC layer, a control message of a MAC layer (e.g., MAC control PDU or MAC control element), a control field or a parameter of a physical layer control channel, or the like.

Meanwhile, the common resource may be configured according to the type of information included in the common information. For example, common resources for resource allocation information for a control channel, resource allocation information for a random access procedure, resource allocation information for a scheduling request, and resource allocation information for a downlink transmission request may be configured differently from each other. In this case, the common resource #1 in FIG. 7 may be used for transmission of the resource allocation information for a control channel, and the common resource #2 in FIG. 7 may be used for transmission of the resource allocation information for a random access procedure. The common resources for common information including different types of information may be configured differently in the plurality of base stations 610-1, 610-2, and 610-3, and the common resources for common information including the same type of information may be configured identically in the plurality of base stations 610-1, 610-2, and 610-3.

Meanwhile, using the common information including the resource allocation information for a random access procedure (or, resource allocation information for a scheduling request, resource allocation information for a downlink transmission request) may mean that the plurality of base stations 610-1, 610-2, and 610-3 configure the resources for the random access procedure (e.g., the resources for the scheduling request, the resources for the downlink transmission request) to be identical absolutely or relatively.

Configuring the resources to be absolutely identical may mean configuring a parameter indicating a frequency resource (e.g., subcarrier index), a parameter indicating a time resource (e.g., radio frame index, subframe index, TTI, slot index, mini-slot index, symbol index, etc.), transmission and reception time related information (e.g., period, interval, window), a resource hopping pattern, beamforming related information (e.g., beam configuration information, beam index), and a code sequence (e.g., bit sequence, signal sequence) with the same values (or the same range).

Configuring the resources to be relatively identical may mean configuring each of the parameter indicating a frequency resource, the parameter indicating a time resource, the transmission and reception time related information, the resource hopping pattern, the beamforming related information, and the code sequence based on a reference value and an offset. The terminal 620 may identify a common resource of a base station supporting a cell coverage to which the terminal 620 belongs by using the reference value and the offset even when a cell coverage to which the terminal 620 belongs is changed.

For example, the location of the common resource in the frequency axis may be determined by a reference value of a subcarrier (e.g., a subcarrier having the largest frequency in the entire frequency band or a subcarrier having the smallest frequency) and an offset (e.g., x subcarriers). Here, x may be a natural number, integer, or a real number greater than or equal to 0. Further, the location of the common resource in the time axis may be indicated by a reference value and an offset of each of the parameter indicating a time resource, the transmission and reception time related information, the resource hopping pattern, the beamforming related information, and the code sequence.

Also, the location of the common resource in the frequency axis or the time axis may be configured by a modular operation. For the modular operation, an identifier of the base station, a system bandwidth, a fast Fourier transform (FFT) size, the number of subcarriers, a subcarrier index, an SFN, the number of radio frames (or, subframes, symbols), a radio frame index (or, subframe index, symbol index), and a sequence used for identifying the base station (or, base station group) may be used.

Meanwhile, a common information acquisition procedure based on the embodiments described with reference to FIGS. 6 to 8 may be performed as follows.

Figure 9:
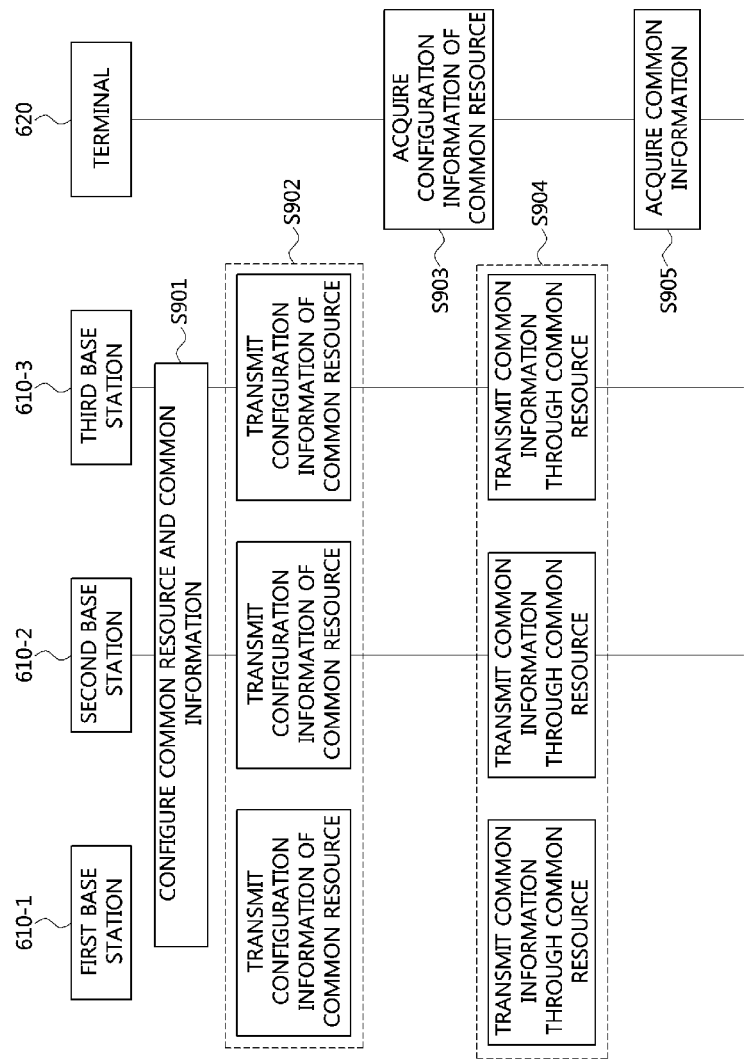
FIG. 9 is a sequence chart illustrating a first embodiment of a common information acquisition procedure in a communication system.

FIG. 9 is a sequence chart illustrating a first embodiment of a common information acquisition procedure in a communication system.

Referring to FIG. 9, a communication system may comprise a first base station 610-1, a second base station 610-2, a third base station 610-3, a terminal 620, and the like. The communication system of FIG. 9 may be the same as the communication system of FIG. 6. For example, each of the first base station 610-1, the second base station 610-2, the third base station 610-3, and the terminal 620 in FIG. 9 may be the same as the first base station 610-1, the second base station 610-2, the third base station 610-3, and the terminal 620 in FIG. 6. The plurality of base stations 610-1, 610-2, and 610-3 may be located in one service area, and the terminal 620 may be located in the corresponding service area. Also, the base stations 610-1, 610-2, and 610-3 and the terminal may be configured to be the same as the communication node 200 shown in FIG. 2.

The plurality of base stations 610-1, 610-2, and 610-3 may perform a procedure for configuring a common resource and common information (S901). The procedure for configuring the common resource and the common information may be performed in the same or similar manner as described with reference to FIGS. 6 to 8. For example, a control entity (e.g., MME, S-GW, or P-GW) of the communication system may configure the common resource and the common information, and transmit the configured common resource and common information to the plurality of base stations 610-1, 610-2, and 610-3. Alternatively, the common resource and common information may be configured through a negotiation procedure between the plurality of base stations 610-1, 610-2, and 610-3. The common resource configured in the step S901 may be the same as the common resource shown in FIG. 7 or 8. Here, the common information may indicate the same information used in the plurality of base stations 610-1, 610-2, and 610-3. The common information may include system information, control information, physical channel configuration/allocation information, reference signal configuration/allocation information, resource allocation information, an SA identifier indicating a service area to which the common information is applied, a duration indicator to indicate a valid duration during which the common information is effectively used, and the like.

The plurality of base stations 610-1, 610-2, and 610-3 may generate configuration information of the common resource. The configuration information of the common resource may include an allocation pattern (e.g., allocated frequency resources, allocated time resources, an allocation period, etc.) of the common resource shown in FIG. 7 or FIG. 8. The plurality of base stations 610-1, 610-2, and 610-3 may transmit the configuration information through a system information transmission procedure or a separate control information signaling procedure (S902).

Meanwhile, the terminal 920 may have completed a connection establishment procedure with the first base station 610-1, and may operate in an RRC_connected state. When the terminal 620 is located within the cell coverage of the first base station 610-1 in the step S902, the terminal 620 may acquire the configuration information of the common resource from the first base station 610-1 through a system information transmission procedure or a separate control information signaling procedure (S903). Accordingly, the terminal 620 may identify the locations of the common resources for the plurality of base stations 610-1, 610-2, and 610-3 based on the configuration information of the common resource. That is, the terminal 620 may identify the locations of the common resources shown in FIG. 7 or 8 based on the configuration information of the common resource.

The plurality of base stations 610-1, 610-2, and 610-3 may transmit the common information by using the common resource (S904). The terminal 620 may acquire the common information for the plurality of base stations 610-1, 610-2, and 610-3 by performing a monitoring operation on the common resources identified in the step S903 (S905). For example, if the terminal 620 is located within the cell coverage of the first base station 610-1 in the steps S904 and S905, the terminal 620 may receive the common information from the first base station 610-1. Thereafter, if the terminal 620 moves from the cell coverage of the first base station 610-1 to the cell coverage of the second base station 610-2, the terminal 620 may perform communications (e.g., random access procedure, scheduling request procedure, downlink transmission request procedure, or the like) with the second base station 610-2 by using the common information acquired from the first base station 610-1 in the step S905 without performing a procedure for acquiring the common information of the second base station 610-2. Here, even when the connection establishment procedure between the terminal 620 and the second base station 610-2 is not completed, the terminal 620 may perform communications with the second base station 610-2. The terminal 620 may also acquire additional system information (e.g., other system information) from the second base station 610-2 to perform communications with the second base station 610-2.

Alternatively, if the terminal 620 is located within the cell coverage of the second base station 610-2 in the steps S904 and S905, the terminal 620 may receive the common information from the second base station 610-2 based on the configuration information of the common resource acquired from the first base station 610-1. In this case, the terminal 620 may perform communications (e.g., random access procedure, scheduling request procedure, downlink transmission request procedure, or the like) with the second base station 610-2 by using the common information acquired from the second base station 610-2. Here, even when the connection establishment procedure between the terminal 620 and the second base station 610-2 is not completed, the terminal 620 may perform communications with the second base station 610-2.

Meanwhile, when the terminal 620 moves from the cell coverage of the first base station 610-1 to the cell coverage of the second base station 610-2, the terminal may receive at least one of a synchronization signal and a radio resource management (RRM) measurement signal by performing a monitoring operation on a preconfigured resource in order to acquire synchronization with the second base station 610-2. The preconfigured resource may be the common resource indicated by the configuration information obtained from the first base station 610-1 in the step S902. The terminal 620 may acquire synchronization with the second base station 610-2 based on at least one of the synchronization signal and the RRM measurement signal received from the second base station 610-2. That is, the terminal 620 may identify a location of a time resource (e.g., subframe index) configured for the second base station 610-2 and a location of a frequency resource (e.g., resource block (RB) index or subcarrier index) configured for the second base station 610-2.

The terminal 620 may identify that a mapping relation between the common resource #1 and the common resource #2 in the frequency band #1 configured for the first base station 610-1 is applied equally to the frequency band #2 configured for the second base station 610-2 based on the common information (e.g., system information included in the common information) or a separate message received from the first base station 610-1. The mapping relation between the common resource #1 and the common resource #2 may be indicated by a relative difference of the time resources (e.g., subframe index offset) and a relative difference of the frequency resources (e.g., RB index offset, subcarrier index offset). Alternatively, the mapping relation between the common resource #1 and the common resource #2 may be indicated by an absolute index (e.g., absolute value, absolute range).

When the second base station 610-2 performs downlink burst transmission using the common resource #1 of the frequency band #2, and the terminal 620 performs uplink burst transmission using the common resource #2 of the frequency band #2, the mapping relation between the common resource #1 and the common resource #2 may be indicated not only by the relative difference of the time-frequency resources, but also by a correspondence relation between downlink resources constituting the common resource #1 and uplink resources constituting the common resource #2. When the mapping relation between the common resource #1 and the common resource #2 in the frequency band #1 is applied to the frequency band #2, the terminal 620 may omit the procedure of acquiring the common information of the second base station 610-2 or the procedure of acquiring a separate physical channel of the second base station 610-2.

Meanwhile, when downlink burst transmission is performed based on a beamforming scheme in the frequency band #1 of the first base station 610-1, a downlink beam may include an analog portion, and when uplink burst transmission is performed based on a beamforming scheme in the frequency band #1 of the first base station 610-1, an uplink beam may include an analog portion. The analog portion of the downlink beam and the analog portion of the uplink beam may be elements that constitute a virtual sector of the first base station 610-1.

Identically to the embodiments described above, the terminal 620 that has acquired the common information in the frequency band #2 of FIG. 8 may use the acquired common information to perform communications (e.g., random access procedure, scheduling request procedure, downlink transmission request procedure, etc.) with the first base station 610-1 in the frequency band #1 of FIG. 8. Here, even when the connection establishment procedure between the terminal 620 and the first base station 610-1 is not completed, the terminal 620 may perform communications with the first base station 610-1.

According to the embodiments described above, even when a cell coverage to which the terminal belongs is changed, the terminal may perform communications (e.g., random access procedure, scheduling request procedure, downlink transmission request procedure, etc.) with a base station supporting the current cell coverage by using the common information obtained before the change of the cell coverage. That is, the terminal may perform communications with the current base station using the common information obtained from the previous base station without performing the procedure of acquiring the common information of the current base station.

Beam Pairing Procedure

Meanwhile, in a communication system based on a millimeter wave (mmWave), communications between a base station and a terminal may be performed based on a beamforming scheme. A beam pairing procedure may be performed for communications based on the beamforming scheme.

Figure 10:
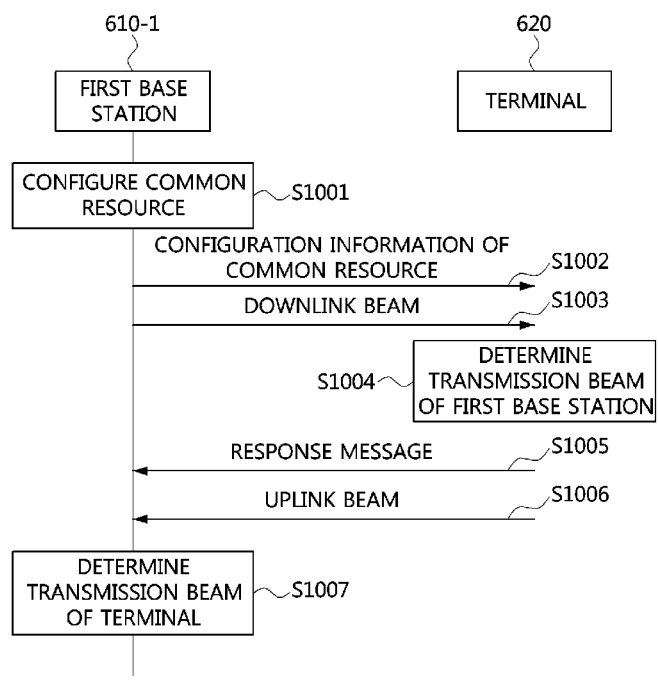
FIG. 10 is a sequence chart illustrating a first embodiment of a beam pairing procedure in a communication system.

FIG. 10 is a sequence chart illustrating a first embodiment of a beam pairing procedure in a communication system.

Referring to FIG. 10, a communication system may include a first base station 610-1, a terminal 620, and the like. The communication system of FIG. 10 may be the same as the communication system of FIG. 6. For example, the first base station 610-1 of FIG. 10 may be the first base station 610-1 of FIG. 6, and the terminal 620 of FIG. 10 may be the terminal 620 of FIG. 6. The first base station 610-1 and the terminal 620 may be configured to be the same as the communication node 200 shown in FIG. 2. Also, the first base station 610-1 and the terminal 620 may comprise a plurality of antennas.

The first base station 610-1 may configure a common resource used for a beam pairing procedure (S1001). The common resource may include a resource (hereinafter referred to as a 'downlink beam resource') used for transmission of a downlink beam and a resource (hereinafter referred to as an 'uplink beam resource') used for transmission of an uplink beam. The first base station 610-1 may configure the common resource #1 of FIG. 7 as the downlink beam resource, and the common resource #2 of FIG. 7 as the uplink beam resource. Here, the downlink beam resource may be referred to as a 'downlink burst resource', and the uplink beam resource may be referred to as an 'uplink burst resource'. Here, a burst may correspond to a physical resource block (PRB) in the LTE-based communication system, and may indicate a time-frequency resource occupied for transmission of data or control information in the physical layer. Also, the burst may indicate a resource region used for beamforming.

The first base station 610-1 may generate configuration information of the common resource. The configuration information of the common resource may include an allocation pattern of the downlink beam resource (e.g., allocated frequency resources, allocated time resources, allocation period, etc.) and an allocation pattern of the uplink beam resource (e.g., allocated frequency resources, allocated time resources, allocation period, etc.). Also, the configuration information of the common resource may include mapping relation information between the downlink beam resource and the uplink beam resource instead of the allocation pattern of the uplink beam resource. The mapping relation information may include a frequency offset, a time offset, an allocation period offset, etc. between the downlink beam resource and the uplink beam resource. Also, the mapping relation information may be configured such that the allocation information of the downlink (or uplink) beam resource corresponds to the allocation information of the uplink (or downlink) beam resource, or corresponds according to a preconfigured mapping rule. Here, the allocation information of the beam resource may include a subcarrier index in the frequency axis, an index of a constituent unit (e.g., radio frame, subframe, symbol, etc.) of the time axis, a beam index according a beamforming scheme, or the like. For example, an uplink beam resource that the terminal 620 can use for a downlink beam resource received for beam pairing may be limited to a specific uplink beam resource according to the mapping relation. Accordingly, the first base station 610-1 may identify the resource of the downlink beam (e.g., the resource of the beam transmitted by the first base station 610-1) received at the terminal 620 for beam paring, by using only the resource of the uplink beam received from the terminal 620.

The first base station 610-1 may inform the terminal 620 of the configuration information of the common resource through a system information transmission procedure or a separate control information signaling procedure (S1002). The terminal 620 may acquire the configuration information of the common resource from the first base station 610-1, and identify the downlink beam resource and the uplink beam resource based on the configuration information of the common resource. The first base station 610-1 may transmit at least one downlink beam through the downlink beam resource (e.g., common resource #1 of FIG. 7) (S1003). For example, the first base station 610-1 may transmit a downlink beam #0 through the common resource #1 of the subframe #0 included in the radio frame #0 of FIG. 7, a downlink beam #1 through the common resource #1 of the subframe #5 included in the radio frame #0 of FIG. 7, and a downlink beam #2 through the common resource #1 of the subframe #0 included in the radio frame #1 of FIG. 7. Here, the transmission of the downlink beam may indicate downlink burst transmission or downlink discovery signal transmission.

The terminal 620 may receive the downlink beams of the first base station 610-1 by performing a monitoring operation on the downlink beam resources and may determine a transmission beam of the first base station 610-1 based on the received downlink beams (S1004). For example, the terminal 620 may determine a downlink beam having the largest received signal strength among the downlink beams as the transmission beam of the first base station 610-1. When the transmission beam of the first base station 610-1 is determined, the terminal 620 may transmit a response message to the first base station 610-1 (S1005). The response message may include an index of the transmission beam of the first base station 610-1 determined in the step S1004. Also, the response message may be a message for a scheduling request, a message including a random access preamble, or the like. When a mapping relation is established between the transmission beam of the first base station 610-1 (e.g., the resource of the downlink beam) and the transmission beam of the terminal 620 (e.g., the resource of the uplink beam), the response message of the first base station 610-1 may not include the index of the transmission beam of the first base station 610-1. In this case, instead of the index of the transmission beam of the first base station 610-1, information on a random access preamble or an uplink beam resource selected according to the mapping relation may be transmitted through the response message.

The first base station 610-1 may receive the response message from the terminal 620, and may identify the transmission beam of the first base station 610-1 based on the response message. When the transmission and reception procedure of the response message is completed, the procedure for determining the transmission beam of the first base station 610-1 may be terminated.

Meanwhile, a determination procedure of the transmission beam of the terminal 620 may be performed. The determination procedure of the transmission beam of the terminal 620 may be performed after the determination of the transmission beam of the first base station 610-1. Alternatively, the determination procedure of the transmission beam of the terminal 620 may be performed independently of the determination procedure of the transmission beam of the first base station 610-1.

The terminal 620 may transmit at least one uplink beam through the uplink beam resource (e.g., common resource #2 of FIG. 7) (S1006). For example, the terminal 620 may transmit an uplink beam #0 through the common resource #2 of the radio frame #0 of FIG. 7, an uplink beam #1 through the common resource #2 of the radio frame #2 of FIG. 7, and an uplink beam #2 through the common resource #2 of the radio frame #4 of FIG. 7. Here, the transmission of the uplink beam may indicate uplink burst transmission or uplink discovery signal transmission.

When an initial access procedure between the terminal 620 and the first base station 610-1 is performed, the terminal 620 may transmit a message including a random access preamble through the uplink beam resource. In this case, the terminal 620 may perform uplink burst transmission by repeatedly transmitting one preamble sequence n times. Alternatively, the terminal 620 may perform uplink burst transmission by transmitting each of n preamble sequences once. The n preamble sequences may be calculated based on a function of an identifier of the terminal 620 (e.g., UE ID), and an index of the downlink beam resource (e.g., slot index, mini-slot index, symbol index, etc.) or an index of the uplink beam resource (e.g., slot index, mini-slot index, symbol index, etc.). Here, n may be an integer of 2 or more. When a connection establishment procedure between the terminal 620 and the first base station 610-1 is completed, the terminal 620 may transmit a sounding reference signal (SRS) through the uplink beam resource.

The first base station 610-1 may receive the uplink beams of the terminal 620 by performing a monitoring operation on the uplink beam resources and may determine the transmission beam of the terminal 620 based on the received uplink beams (S1007). For example, the first base station 610-1 may determine an uplink beam having the largest received signal strength among the uplink beams as the transmission beam of the terminal 620. When the transmission beam of the terminal 620 is determined, the first base station 610-1 may inform the terminal 620 of an index of the transmission beam of the terminal 620 determined in the step S1007. However, when the transmission beam of the terminal 620 is determined according to the above-described mapping relation between the transmission beam of the first base station 610-1 (e.g., downlink beam resource) and the transmission beam of the terminal 620 (e.g., uplink beam resource), the procedure for the first base station 610-1 to inform the index of the transmission beam of the terminal 620 may be omitted. When the transmission beam of the first base station 610-1 and the transmission beam of the terminal 620 are determined, each of the first base station 610-1 and the terminal 620 may perform communications the transmission beam.

Random Access Procedure According to State of Terminal

Meanwhile, a random access procedure may be classified into a random access procedure for initial access (hereinafter referred to as an 'initial random access procedure') and a random access procedure for non-initial access (hereinafter referred to as a 'non-initial random access procedure'). The initial random access procedure may be performed in absence of context information. The context information may be RRC context information, access stratum (AS) configuration information, and the like. The context information may include RRC configuration information for a terminal, security configuration information, packet data convergence protocol (PDCP) information (e.g., PDCP information according to a robust header compression (ROHC) mode), an identifier of the terminal (e.g., cell-radio network temporary identifier (C-RNTI)), an identifier of a base station, and the like.

The non-initial random access procedure may be performed for a communication procedure according to arrival of transmission data (or reception data), a connection resume procedure, a resource allocation request procedure, a terminal-based transmission request procedure, a link reconfiguration request procedure after a radio link failure (RLF), a mobility support procedure (e.g., handover procedure), a secondary cell addition/change procedure, an active beam addition/change procedure, an access request procedure for synchronization acquisition, and the like.

The initial random access procedure or the non-initial random access procedure may be performed depending on the operation state of the terminal. The operation state of the terminal may be as follows.

Figure 11:
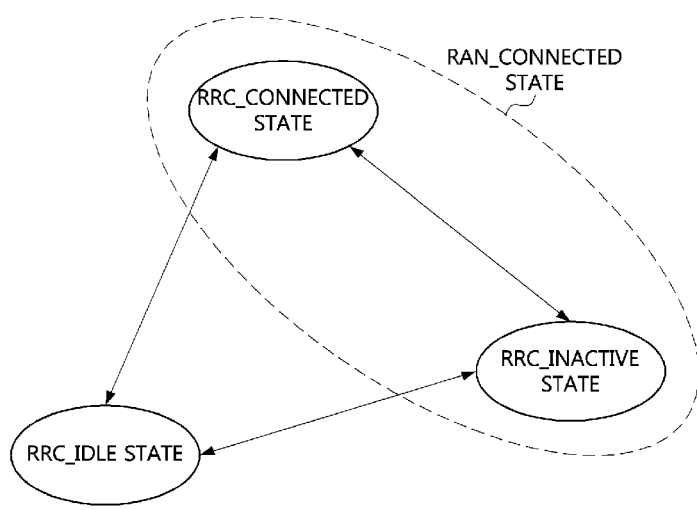
FIG. 11 is a conceptual diagram illustrating an operation state of a terminal in a communication system.

FIG. 11 is a conceptual diagram illustrating an operation state of a terminal in a communication system.

Referring to FIG. 11, a terminal may operate in an RRC_idle state, an RRC_connected state, or an RRC_inactive state. Also, a radio access network connected state (RAN_connected state) may include the RRC_connected state and the RRC_inactive state. In the RAN_connected state, a base station and a terminal may store and manage context information, connection configuration information, or the like. That is, the RAN_connected state may be a connected state in that context information or connection configuration information is stored and managed between the network and the terminal, and may be distinguished from the connected state of the RRC connection perspective. For example, the connected state of the RRC connection perspective may mean that a data radio bearer is configured and maintained. For a terminal operating in the RRC_connected state, a control channel, a reference signal, and the like used for connection configuration maintenance and data transmission and reception procedures may be configured. The reference signal may be a demodulation reference signal (DMRS) used for demodulating data, an SRS used for measuring a channel quality, a reference signal used for beamforming, or the like. Therefore, the terminal operating in the RRC_connected state may perform the data transmission and reception procedure without additional delay.

The context information, the connection configuration information, and the like for the terminal operating in the RRC_inactive state may be stored and managed in the base station and the corresponding terminal. However, in the RRC_inactive state, the terminal may operate similarly to as in the RRC_idle state. Therefore, the terminal operating in the RRC_inactive state may perform the non-initial random access procedure to perform the data transmission and reception procedure because the data radio bearer has been released or the configuration of the data radio bearer has been stopped. When the non-initial random access procedure is completed, the operation state of the terminal may transition from the RRC_inactive state to the RRC_connected state, and the terminal operating in the RRC_connected state may perform the data transmission and reception procedures by using the configured data radio bearer. Alternatively, the terminal in the RRC_inactive state may transmit data of a limited size, data according to a limited service quality, data according to a limited service, and the like.

In the RRC_idle state, the connection between the base station and the terminal may not be established, and the context information and connection configuration information of the terminal may not be stored in the base station and the corresponding terminal. Therefore, the terminal operating in the RRC_idle state may perform the initial random access procedure. In this case, the operation state of the terminal may transition from the RRC_idle state to the RRC_connected state.

Alternatively, according to the control of the base station, the operation state of the terminal may transition from the RRC_idle state to the RRC_inactive state, and a limited service may be provided for the terminal operating in the RRC_inactive state. Here, the operation state of the terminal may be transited from the RRC_idle state to the RRC_inactive state by a random access procedure defined separately. Whether or not to perform the transition from the RRC_idle state to the RRC_inactive state may be determined according to the type of the terminal, the capability of the terminal, the type of the service, and the like. The base station (or, a control entity of the communication system) may configure a transition condition from the RRC_idle state to the RRC_inactive state, and control the transition operation from the RRC_idle state to the RRC_inactive state according to the transition condition. For example, when the base station (or, the control entity of the communication system) permits the transition from the RRC_idle state to the RRC_inactive state, the operation state of the terminal may transition from the RRC_idle state to the RRC_inactive state.

Meanwhile, a resource for the above-described random access procedure may be a cell-specific resource. When a common resource for a random access procedure is configured in a plurality of cells (e.g., a plurality of base stations), an identifier or a virtual cell identifier for distinguishing a specific area may be used for identifying the common resource. For example, a common resource for the initial random access procedure may be identified by a virtual cell identifier. When the virtual cell identifier includes a downlink identifier and an uplink identifier, a downlink resource among the common resource may be identified by the downlink identifier, and an uplink resource among the common resource may be identified by the uplink identifier.

When a frequency division duplex (FDD) scheme is used in the communication system, downlink resources and uplink resources may always exist. On the other hand, when a time division duplex (TDD) scheme is used in the communication system, downlink resources and uplink resources may exist independently for each base station. In a TDD-based communication system, when a plurality of base stations use the same uplink-downlink (UL-DL) configuration, a common resource for the plurality of base stations may be configured. The terminal may acquire configuration information of the common resource from an arbitrary base station belonging to a base station group (e.g., a group of base stations sharing the common resource). Therefore, the location of the common resource in the time axis may be set to belong to resources (e.g., downlink resources, uplink resources) that all base stations belonging to the base station group have in common.

For example, when the common resource is used for downlink transmission, a resource configured as a downlink resource (e.g., downlink subframe) in all base stations belonging to the base station group may be configured as the common resource. When the common resource is used for uplink transmission or side link transmission, a resource configured as an uplink resource (e.g., uplink subframe) in all base stations belonging to the base station group may be configured as the common resource.

Meanwhile, when the FDD scheme is used in the NR communication system, downlink resources and uplink resources may always exist. On the other hand, when the TDD scheme is used in the NR communication system, the downlink resources and the uplink resources may exist independently for each base station. For example, when a dynamic TDD scheme is used in the NR communication system, the location of each of a downlink subframe (or, downlink slot) and an uplink subframe (or, uplink slot) in a base station may be different from the location of each of a downlink subframe (or, downlink slot) and an uplink subframe (or, uplink slot) in another base station.

Downlink Transmission Request Procedure

Next, a downlink transmission request procedure based on the embodiments described with reference to FIGS. 7 to 9 will be described. In the downlink transmission request procedure, the terminal may transmit a message requesting transmission of necessary information to the base station and obtain the necessary information from the base station. Here, the necessary information may be firmware (e.g., software update information for the terminal), information required for operation (e.g., service) of the terminal, and the like. In addition, the necessary information may include signaling information (e.g., dedicated control message) as well as common information (e.g., system information) transmitted in a broadcast manner. The necessary information may be as shown in Table 1 below.

TABLE 1

| Information Element | Description |
| --- | --- |
| 1 | Physical layer configuration information (e.g., system bandwidth, SFN, synchronization signal, reference signal, etc.) |
| 2 | Location information and control information for a location based service (LBS) |
| 3 | Configuration information of physical layer channels (e.g., data transmission channel, control information transmission channel) |
| 4 | System information configuration/transmission information (e.g., scheduling information) |
| 5 | Adjacent frequency (or, adjacent base station) information |
| 6 | Adjacent RAT information |
| 7 | Broadcast/multicast service information (e.g., multimedia broadcast multicast service (MBMS), single cell point to multipoint (SCPTM)) |
| 8 | Physical layer configuration/allocation information for specific functions (e.g., D2D communications, IoT, vehicle communications, etc.) |
| 9 | Traffic information and navigation information for supporting autonomous driving |
| 10 | Information for supporting mobility functions (e.g., handover) |

Some of the plurality of base stations sharing the common resource may operate based on the dynamic TDD scheme and the remaining base stations may operate based on a semi-static TDD scheme. Alternatively, all base stations sharing the common resource may operate based on the dynamic TDD scheme. When the dynamic TDD scheme is used in the NR communication system, the type of a resource located in a specific region on the time axis may be fixed as a downlink resource or an uplink resource, and the resource fixed as the downlink resource or the uplink resource may be configured as the common resource. A pattern of the fixed resources may be indicated based on a period and an offset. The base station may inform the terminal of the period and offset indicating the pattern of the fixed resources through the system information transmission procedure or the signaling procedure of the separate control information, and the terminal may identify the pattern of the fixed resources based on the obtained period and offset.

For example, the fixed resources may be RRM measurement resources, resources for a random access procedure (e.g., physical random access channel (PRACH)), and the like. The base station may configure downlink resources (e.g., subframe, slot, mini-slot) for RRM measurement according to a preset cycle (e.g., 40 ms), and transmit a RRM reference signal (RRM RS) using the configured downlink resources. Also, the base station may configure uplink resources (e.g., subframe, slot, mini-slot) for a random access procedure according to a preset cycle (e.g., 2 ms).

Figure 12:
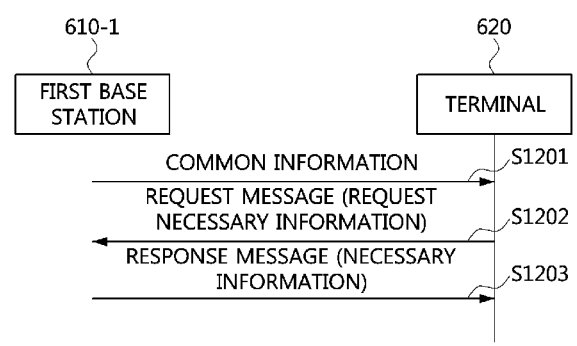
FIG. 12 is a sequence chart illustrating a first embodiment of a downlink transmission request procedure in a communication system.

FIG. 12 is a sequence chart illustrating a first embodiment of a downlink transmission request procedure in a communication system.

Referring to FIG. 12, a communication system may include a first base station 610-1, a terminal 620, and the like. The communication system of FIG. 12 may be the same as the communication system of FIG. 6. For example, the first base station 610-1 of FIG. 12 may be the first base station 610-1 of FIG. 6, and the terminal 620 of FIG. 12 may be the terminal 620 of FIG. 6. The first base station 610-1 and the terminal 620 may be configured to be the same as the communication node 200 shown in FIG. 2.

The first base station 610-1 may transmit common information through a common resource (S1201). The step S1201 may be the same as the step S904 of FIG. 9. The common information may include system information, control information, physical channel configuration/allocation information, reference signal configuration/allocation information, resource allocation information, an SA identifier indicating a service area to which the common information is applied, a duration indicator indicating a valid duration during which the common information is effectively used, and the like. The resource allocation information may include resource allocation information for a control channel, resource allocation information for a random access procedure, resource allocation information for a scheduling request procedure (e.g., resource request procedure), resource allocation information for a downlink transmission request (e.g., resource allocation information for a downlink transmission request procedure), resource allocation information for D2D communications, or the like.

The terminal 620 may receive the common information from the first base station 610-1, and identify the resource allocation information for the downlink transmission request procedure included in the common information. The resource allocation information for the downlink transmission request procedure may include a parameter indicating a frequency resource, a parameter indicating a time resource, a resource hopping pattern, beamforming related information, a code sequence (e.g., bit sequence, signal sequence), and the like.

The resource allocation information may indicate different resources according to the information elements listed in Table 1. For example, the information element #1 of Table 1 may be mapped to a code sequence #1 indicated by the resource allocation information, and the information element #2 of Table 1 may be mapped to a code sequence #2 indicated by the resource allocation information. Thus, when the information element #1 is needed, the terminal 620 may transmit a request message including the code sequence #1 to the first base station 610-1, and the first base station 610-1 may transmit a response message including the information element #1 corresponding to the code sequence #1 to the terminal 620, when the code sequence #1 is received from the terminal 620. Here, the code sequence may be a preamble sequence used in the random access procedure.

Also, the information element #3 of Table 1 may be mapped to a time-frequency resource #1 indicated by the resource allocation information, and the information element #4 of Table 1 may be mapped to a time-frequency resource #2. Therefore, when the information element #3 is needed, the terminal 620 may transmit a request message to the first base station 610-1 by using the time-frequency resource #1, and first base station 610-1 may transmit a response message including the information element #3 corresponding to the time-frequency resource #1 to the terminal 620, when the request message is received through the time-frequency resource #1. Here, the time-frequency resource may be a resource used in the random access procedure. The mapping relation between the information elements of Table 1 and the resources indicated by the resource allocation information may be transmitted from the first base station 610-1 to the terminal 620 through the common information transmission procedure, the system information transmission procedure, the control information signaling procedure, or the like.

Meanwhile, the terminal 620 may identify a resource mapped to necessary information (e.g., the information element described in Table 1) based on the resource allocation information included in the common information, and transmit a request message to the first base station 610-1 by using the identified resource (S1201). The request message may be transmitted through the common resource shown in FIG. 7 or FIG. 8. For example, when the information element #2 is needed, the terminal 620 may transmit the request message including the code sequence #2 to first base station 610-1, and when the information element #4 is needed, the terminal 620 may transmit the request message to the first base station 610-1 by using the time-frequency resource #2. Here, the request message may be a message (e.g., a random access preamble) used in a random access procedure.

Alternatively, the request message may be configured with a physical layer control channel or a MAC layer or higher control channel. In this case, values of a specific field included in the request message and the information elements described in Table 1 may be mapped. For example, the specific field set to '100' may request transmission of the information element #5 of Table 1, and the specific field set to '101' may request transmission of the information element #6 of Table 1. The mapping relation between the information elements described in Table 1 and the values of the specific field may be transmitted from the first base station 610-1 to the terminal 620 through the common information transmission procedure, the system information transmission procedure, the control information signaling procedure, or the like.

The first base station 610-1 may receive the request message from the terminal 620, and may identify information to be transmitted to the terminal 620 based on the request message. For example, when the request message includes the code sequence #2, the first base station 610-1 may determine that transmission of the information element #2 of Table 1 corresponding to the code sequence #2 is requested. When the request message is received through the time-frequency resource #2, the first base station 610-1 may determine that transmission of the information element #4 of Table 1 corresponding to the time-frequency resource #2 is requested. When the specific field of the request message is set to '100', the first base station 610-1 may determine that transmission of the information element #5 of Table 1 corresponding to the specific field set to '100' is requested.

The first base station 610-1 may generate a response message including the information element to be transmitted, and may transmit the response message to the terminal 620 (S1203). The response message may be transmitted through the common resource shown in FIG. 7 or 8 or a downlink radio resource of each base station (e.g., the first base station 610-1). The terminal 620 may receive the response message from the first base station 610-1, and identify the information element included in the response message.

Random Access Procedure

Next, a random access procedure based on the embodiments described with reference to FIGS. 7 to 9 and FIG. 12 will be described.

Figure 13:
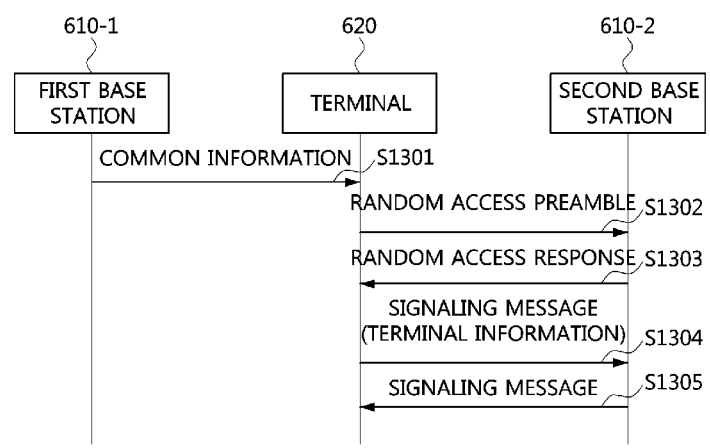
FIG. 13 is a sequence chart illustrating a first embodiment of a random access procedure in a communication system.

FIG. 13 is a sequence chart illustrating a first embodiment of a random access procedure in a communication system.

Referring to FIG. 13, a communication system may include a first base station 610-1, a second base station 610-2, a terminal 620, and the like. The communication system of FIG. 13 may be the same as the communication system of FIG. 6. For example, the first base station 610-1 of FIG. 13 may be the first base station 610-1 of FIG. 6, the second base station 610-2 of FIG. 13 may be the second base station 610-2 of FIG. 6, and the terminal 620 of FIG. 13 may be the terminal 620 of FIG. 6. The first base station 610-1, the second base station 610-2, and the terminal 620 may be configured to be the same as the communication node 200 shown in FIG. 2.

The first base station 610-1 may transmit common information through a common resource (S1301). The step S1301 may be the same as the step S904 of FIG. 9. The common information may be configured identically in the plurality of base stations (e.g., the first base station 610-1 and the second base station 610-2). The common information may include system information, control information, physical channel configuration/allocation information, reference signal configuration/allocation information, resource allocation information, an SA identifier indicating a service area to which the common information is applied, a duration indicator indicating a valid duration during which the common information is effectively used, and the like. The resource allocation information may include resource allocation information for a control channel, resource allocation information for a random access procedure, resource allocation information for a scheduling request procedure (e.g., resource request procedure), resource allocation information for a downlink transmission request procedure, resource allocation information for D2D communications, or the like. The resource allocation information may include a parameter (e.g., reference value and offset) indicating a frequency resource, a parameter (e.g., a reference value and an offset) indicating a time resource, a resource hopping pattern, beamforming related information, a code sequence (e.g., a bit sequence, a signal sequence), an inactivated radio resource region (or, duration), and the like.

The terminal 620 may belong to the cell coverage of the first base station and the connection establishment procedure between the terminal 620 and the first base station 610-1 may be completed. The terminal 620 may receive the common information from the first base station 610-1, and identify the resource allocation information for the random access procedure (or downlink transmission request procedure) included in the common information. The resource allocation information for the random access procedure (or, downlink transmission request procedure) may include a parameter indicating a frequency resource, a parameter indicating a time resource, a resource hopping pattern, beamforming related information, a code sequence (e.g., bit sequence, signal sequence), and the like.

Meanwhile, the first base station 610-1 may transmit the common information based on a beam sweeping scheme (e.g., downlink burst transmission scheme). In this case, the common information may be transmitted in a plurality of virtual sectors of the first base station 610-1 in a time division multiplex (TDM) manner. For example, the first base station 610-1 may configure broadcast information (e.g., a mapping relation between resources for transmission of downlink control information and resources for the random access procedure) for each virtual sector, and transmit the broadcast information through the common resource based on the beam sweeping scheme. Considering signaling overhead in the communication system, it may be desirable that the same mapping relation is established in the virtual sectors of the first base station 610-1. In this case, the first base station 610-1 may repeatedly transmit the same broadcast information based on the downlink burst transmission scheme, and the terminal 620 may identify the broadcast information of the first base station 610-1 when the broadcast information is received only once form the first base station 610-1.

When the terminal 620 moves from the cell coverage of the first base station 610-1 to the cell coverage of the second base station 610-2, the terminal 620 may perform communications (e.g., random access procedure, downlink transmission request procedure, or the like) with the second base station 610-2 by using the common information (e.g., the broadcast information) acquired from the first base station 610-1. In this case, the terminal 620 may perform communications with the second base station 610-2 without performing a procedure of acquiring common information from the second base station 610-2. Alternatively, the terminal 620 may communicate with the second base station 610-2 after acquiring partial system information (e.g., Remaining system information, other system information) from the second base station 610-2.

The terminal 620 may transmit to the second base station 610-2 a random access preamble (or, the request message in the step S1202 of FIG. 12 when the downlink transmission request procedure is performed) by using a resource indicated by the common information acquired from the first base station 610-1 (S1302). The second base station 610-2 may receive the random access preamble (or, the request message in the step S1202 of FIG. 12) from the terminal 620, and may transmit to the terminal 620 a response message (i.e., a response message including information (e.g., information element of Table 1) requested by the terminal 620) to the random access preamble (S1303). The terminal 620 may receive the response message (or, the response message in the step S1203 of FIG. 12) to the random access preamble from the second base station 610-2.

The response message received in the step S1303 may include scheduling information for the signaling message in step S1305. The scheduling information may include an identifier of the base station (e.g., the second base station 610-2) transmitting the signaling message of the step S1305, a beam index, an indicator for identifying the scheduling information, resource allocation information, modulation and coding scheme (MCS) information, resource allocation information for transmission of a feedback message (e.g., acknowledgment (ACK) message, negative ACK (NACK) message), and the like. The resource allocation information may include a parameter indicating a frequency resource, a parameter indicating a time resource, transmission and reception time related information (e.g., period, interval, window), and the like.

Meanwhile, a plurality of base stations may receive the random access preamble of the terminal 620, in which case each of the plurality of base stations may transmit a random access response to the terminal 620. Here, the random access response may include an identifier (e.g., a cell identifier) of the base station. When random access responses are received from the plurality of base stations, the terminal 620 may select one base station that satisfies preconfigured conditions among the plurality of base stations. Here, the preconfigured condition may be included in the random access response in the step S1303. Alternatively, the terminal 620 may arbitrarily select one base station among the plurality of base stations. The terminal 620 may perform the steps S1304 and S1305 with the selected base station.

When a downlink transmission request procedure is performed, the response message of the step S1303 may include essential system information (e.g., a master information block (MIB)), scheduling information of system information (e.g., system information block (SIB1)), configuration information (e.g., SIB2) of a physical layer channel of the corresponding base station, system information for specific functions (e.g., MBMS, D2D communications, machine type communication (MTC), IoT, vehicle communications (e.g., vehicle to everything (V2X)), alarms for disasters and social safety nets, transmission of location information and common time, interworking with other RAT systems, etc.), updated system information, and the like.

When the response message is received from the second base station 610-2, the terminal 620 may transmit a signaling message including information on the terminal 620 to the second base station 610-2 (S1304). The information on the terminal 620 may include an identifier, a capability, an attribute, a movement state, a location, and the like. Further, the signaling message of the step S1304 may be used to request necessary information. That is, the signaling message of the step S1304 may be configured to be the same as the request message of the step S1202 of FIG. 12. Also, when the information element requested by the terminal 620 (e.g., the information element in Table 1) is not identified in the step S1302 alone, the signaling message of the step S1304 may be transmitted. That is, when the necessary information element requested by the terminal 620 is identified in the step S1302 alone, the step S1304 may be omitted. When the step S1304 is performed, the second base station 610-2, which has received the signaling message requesting the necessary information, may generate a signaling message including the information (e.g., the information element of Table 1) requested by the terminal 620, and transmit the signaling message to the terminal 620 (S1305). The terminal 620 may receive the signaling message from the second base station 610-2, and may identify the information included in the signaling message. Here, the step S1305 may be selectively performed. That is, when the requested information does not exist, the terminal 620 may not perform the step S1305.

On the other hand, the terminal 620 may perform the steps S1304 and S1305 with a third base station (e.g., the third base station 610-3 shown in FIG. 6) instead of the second base station 610-2. Here, a RAT (e.g., system bandwidth, transmission carrier, and configuration of protocol layers) supported by the third base station 610-3 may be different from the RATs (e.g., system bandwidth, transmission carrier, and configuration of protocol layers) supported by the first base station 610-1 and the second base station 610-2. The common information of the step S1301 may be shared by the base stations 610-1, 610-2, and 610-3, and the common information may be used for the random access procedure, the procedure of requesting necessary information (e.g., downlink transmission request procedure), and the like between the terminal 620 and the base stations 610-1, 610-2, and 610-3.

For example, in the step S1304, the terminal 620 may transmit the signaling message requesting the necessary information to the third base station 610-3, and the third base station 610-3 may receive the signaling message from the terminal 620. In the step S1305, the third base station 610-3 may generate the signaling message including the information (e.g., the information elements of Table 1) requested by the terminal 620, and transmit the signaling message to the terminal 620. Accordingly, the terminal 620 may receive the signaling message from the third base station 610-3, and may identify the information included in the signaling message.

Meanwhile, physical layer synchronization of the base stations 610-1, 610-2, and 610-3 may be considered in the transmission and reception procedure between the terminal 620 and the base stations 610-1, 610-2, and 610-3. When the first base station 610-1 and the second base station 610-2 operate in the TDD manner, the first base station 610-1 may be assumed to be synchronized with the second base station 610-2. However, when the first base station 610-1 and the second base station 610-2 operate in the FDD manner, the first base station 610-1 may be assumed not to be synchronized with the second base station 610-2. Therefore, even when the common resource is configured between the first base station 610-1 and the second base station 610-2, the location of the common resource of the first base station 610-1 may be different from the location of the common resource of the second base station 610-2 in the time axis.

For example, when the random access procedure is performed using the common resource, a time point when the terminal 620 transmits the random access preamble to the first base station 610-1 may be different from a time point when the terminal 620 transmits the random access preamble to the second base station 610-2. That is, since the random access procedure for the first base station 610-1 is performed according to an uplink subframe boundary of the first base station 610-1, and the random access procedure for the second base station 610-2 is performed according to an uplink subframe boundary of the second base station 610-2, the transmission time point of the random access preamble for the first base station 610-1 may be different from the transmission time point of the random access preamble for the second base station 610-2.

Accordingly, the terminal 620 that has acquired the configuration information of the common resource from the first base station 610-1 may acquire uplink synchronization with the second base station 610-2 in order to perform the random access procedure with the second base station 610-2. After the uplink synchronization with the second base station 610-2 is acquired, the terminal 620 may estimate a resource (e.g., PRACH) for the random access procedure with the second base station 610-2 by using the configuration information of the common resource obtained from the first base station 610-1, and transmit a random access preamble to the second base station 610-2 through the estimated resource.

Meanwhile, since the terminal 620 may perform random access procedures with all the base stations (e.g., the first base station 610-1, the second base station 610-2, and the third base station 610-3) sharing the common resource by using the common resource, the terminal 620 may not perform RRM measurement procedures to determine a target base station (e.g., the second base station 610-2) for which the random access procedure is performed. However, the terminal 620 may use reference signals of the second base station 610-2 for determining a transmission power of the random access preamble and for power ramping. For example, the terminal 620 may estimate a downlink path loss based on the reference signals of the second base station 610-2, and may determine the transmit power for the random access preamble based on the estimated path loss.

Also, the terminal 620 may receive control information of the target base station (e.g., the second base station 610-2) to receive a random access response. In order to receive the control information of the second base station 610-2, the terminal 620 may obtain not only downlink synchronization information of the second base station 610-2 but also information necessary for demodulating the control information (e.g. system bandwidth, physical hybrid-ARQ (automatic repeat request) indicator channel (PHICH) resource configuration information, SFN, cell-specific reference signal (CRS) port configuration information, and the like). In the LTE-based communication system, the terminal 620 may obtain the information necessary for demodulating the control information through the MIB. In the NR communication system, the terminal 620 may obtain the information necessary for demodulating the control information through system information (e.g., minimum system information, essential system information) transmitted in the MIB or the broadcast scheme. The information necessary for demodulating the control information may include scheduling information of other system information, configuration information of multiple radio frames, configuration information of a subcarrier spacing of a set bandwidth, allocation (or configuration) parameters of physical layer control channels on the frequency (or time) axis according to a symbol configuration.

The system information transmitted in the broadcast manner may be commonly applied to a plurality of base stations (e.g., a plurality of cells). The terminal 620 may determine common information (e.g., common information already obtained, common information to be newly obtained) used for the random access procedure (or, cell selection procedure, cell reselection procedure) based on an SA identified included in the common information, information indicating validity of the system information (e.g., a duration indicator indicating a valid duration during which the common information is effectively used, a tag, information notifying that the system information will change, etc.), and the like.

Procedure for Transmitting System Information Based on On-Demand Scheme

Next, a procedure of transmitting the system information based on the on-demand scheme will be described. The procedure of transferring the system information based on the on-demand scheme may be performed based on a random access procedure. For example, the terminal may perform a random access procedure when additional system information is needed. An identifier and a radio resource for the random access procedure performed to request additional system information may be configured separately. The base station may receive a random access preamble requesting transmission of the additional system information from the terminal, and may transmit a random access response to the terminal including the additional system information requested by the terminal. The terminal may receive the random access response from the base station, and may identify the additional system information included in the random access response.

Meanwhile, a tag may be used to manage system information. When the system information is received from the base station, the terminal may check a tag included in the system information. When the tag indicates that one additional system information is needed, the terminal may transmit to the base station a request message requesting transmission of the one additional system information. When the request message is received from the terminal, the base station may transmit the one additional system information to the terminal. The terminal may obtain the one additional system information from the base station, and the procedure of transferring the system information may be terminated when the one additional system information is obtained.

Alternatively, when the tag indicates that two additional system information are needed, the terminal may transmit to the base station a request message requesting transmission of the two additional system information. The request message may include respective identifiers of the two additional system information. When the request message is received from the terminal, the base station may transmit the two additional system information (e.g., the two additional system information indicated by the identifiers included in the request message) to the terminal. The terminal may obtain the two additional system information from the base station, and the procedure of transferring the system information may be terminated when the two additional system information are obtained.

Meanwhile, when the system information is changed (e.g., updated), the base station may inform the terminal that the system information has changed. The information indicating that the system information has been changed may be indicated by a bitmap or a tag (e.g., a tag of an SIB unit). Here, when the system information is composed of a plurality of system information blocks (SIBs), bits of the bitmap may be configured for the respective SIBs, and a value tag of the SIB may be configured for the respective SIBs. Therefore, a bit of the bitmap or a value tag of the SIB may indicate a validity of the corresponding SIB to which the bit or the value is mapped. For example, a specific bit set to 0 within the bitmap may indicate that the SIB corresponding to the specific bit has not changed, and a specific bit set to 1 within the bitmap may indicate that the SIB corresponding to the specific bit has changed. Accordingly, the terminal may identify the changed system information based on the bitmap or the tag obtained from the base station. Also, the terminal may identify the changed system information by comparing the current bitmap (or tag) with the previous bitmap (or tag).

In the case that the system information is classified into minimum system information and other system information, the base station may inform the terminal whether the minimum system information and the other system information have been changed, respectively. The minimum system information may be referred to as essential system information, basic system information, etc., and the other system information may be referred to as additional system information, etc. The minimum system information may be common control information transmitted via the SIB. The other system information may be system information excluding the minimum system information among the entire system information.

In addition, the minimum system information may be classified into primary minimum system information and secondary minimum system information. The minimum system information may include the tag and the bitmap indicating that the system information has changed. The secondary minimum system information may include scheduling information for transmission of other system information, multi-radio frame configuration information, configuration information of a physical layer control channel, and the like. Here, in the case that a radio frame of the corresponding cell (or the base station) is configured in one or more frame formats, the multi-radio frame configuration information may include configuration parameters for mini-slots and subframes constituting the radio frame, a sub-carrier spacing, and configuration parameters for a symbol, and the like. Also, the configuration information of a physical layer control channel may include a bandwidth configuration parameter for the multi-radio frame configuration or data/control information transmission, a radio resource allocation parameter (e.g., configuration information of radio resource elements in the time and frequency axes, transmission period, transmission interval, transmission symbol interval of data/control information, etc.) for a physical layer control channel allocated to each bandwidth, and the like.

The primary minimum system information and the secondary minimum system information may be transmitted through different channels, respectively. For example, the primary minimum system information may be transmitted via a physical broadcast channel (PBCH), and the secondary minimum system information may be transmitted via a physical downlink shared channel (PDSCH) or other PBCH. Here, a time-frequency resource of the PBCH to which the primary minimum system information is transmitted may be different from a time-frequency resource of the PBCH to which the secondary minimum system information is transmitted. The secondary minimum system information transmitted via the PDSCH may be transmitted in a specific beamforming unit (e.g., a beamforming group unit) using a broadcast scheme, a multicast scheme, or a unicast scheme. That is, the secondary minimum system information transmitted via the PDSCH may not be transmitted in a broadcast manner throughout the cell.

An identifier (e.g., a minimum system information-radio network temporary identifier (SI-RNTI)) may be configured for scheduling information of the PBCH or the PDSCH through which the secondary minimum system information is transmitted. Accordingly, the terminal may perform a monitoring operation on preconfigured time-frequency resources to obtain the minimum system information (e.g., primary minimum system information and secondary minimum system information). Alternatively, the terminal may search for the identifier (e.g., minimum SI-RNTI) for the scheduling information of the minimum system information (e.g., primary minimum system information and secondary minimum system information).

That is, when the primary minimum system information is transmitted via the PBCH and the secondary minimum system information is transmitted via the PDSCH, the terminal may receive the secondary minimum system information through radio resources repeatedly allocated according to a predetermined period in the communication system or by monitoring the minimum SI-RNTI. In this case, the scheduling information for the radio resource of the PDSCH through which the secondary minimum system information is transmitted may be included in the primary minimum system information. The scheduling information may include configuration information of the radio resource through which the secondary minimum system information is transmitted, a transmission period, or an index (or an index offset) according to the multi-radio frame configuration.

Meanwhile, the control information indicating that each of the minimum system information and the other system information has been changed may be transmitted through a separate resource. For example, a channel (e.g., a channel occurrence cycle) through which the control information indicating that the minimum system information has been changed is transmitted may be different from a channel (e.g., a channel occurrence cycle) through which the control information indicating that other system information has been changed. Also, each of the scheduling information (e.g., scheduling identifier, and configuration information of control fields in the scheduling information) and the scrambling sequence for transmission of the control information indicating that the minimum system information has been changed may be different from each of the scheduling information (e.g., scheduling identifier, and configuration information of control fields in the scheduling information) and the scrambling sequence for transmission of the control information indicating that the other system information has been changed. In the case that the minimum system information is classified into the primary minimum system information and the secondary minimum system information, the control information indicating that each of the primary minimum system information and the secondary minimum system information has been changed may be transmitted through a separate resource.

The information indicating that the system information has been changed (e.g., updated) may be signaled via a control channel (e.g., control message) transmitted in a beamforming unit (e.g., in a beamforming group unit). Here, the control channel (e.g., the control message) may further include information notifying that the system information will change. The information indicating that the system information has been changed may be expressed by a bitmap or a tag. The bitmap may consist of a bit sequence, and each of the bits contained in the bit sequence may be mapped to corresponding system information (e.g., SIB). Whether or not the system information mapped to the bit has been changed may be indicated by the corresponding bit value. The information for notifying that the system information will change may be configured for the respective SIBs, and may indicate a modification period (or, a change time point) of the corresponding system information. When the information for notifying that the system information will change indicates the change time point, the change time point may be represented by a hyper frame number (HFN), an SFN, a subframe index, or the like. Alternatively, the change time point may be represented by an absolute time (e.g., milliseconds, seconds, minutes, hours, etc.). Alternatively, the change time point may be represented by a timer. The timer may be expressed in units of mini-slots, slots, subframes, radio frames, milliseconds, seconds, minutes, hours, and the like.

Accordingly, the terminal may identify that the system information has been changed by receiving the information indicating that the system information has been changed from the base station. Further, the terminal may identify that the system information will be changed by receiving the information notifying the change of the system information from the base station. In this case, the terminal may perform a procedure of acquiring the changed system information. The terminal may transmit a message requesting transmission of new system information to the base station based on the on-demand scheme before the system information is changed, and may receive the new system information (i.e., changed system information) from the base station. For example, when preconfigured conditions are satisfied, the terminal may identify whether the system information has been changed (or, will be scheduled to change) or not before performing a discontinuous reception (DRX) operation, before performing a transition operation from the RRC_connected state to the RRC_idle state, or in any other necessary case.

When the change of the system information (or that the system information will be changed) is identified, the terminal may request, in the on-demand scheme, the base station to transmit new system information (i.e., changed system information) or request the base station to transmit necessary system information before the system information is changed, and may receive the new system information from the base station. A timer indicating a time point at which the new system information can be acquired before or after the change of the system information may be configured. In this case, the terminal may request the base station to transmit new system information at the time point indicated by the timer, and may receive the new system information from the base station.

Meanwhile, an IoT terminal, an MTC terminal or a terminal supporting only an outgoing service (e.g., a mobile originated (MO) service) may not receive a paging channel (hereinafter referred to as an 'incoming paging channel') for an incoming service (e.g., a mobile terminated (MT) service). The information indicating that the system information has been changed for the terminal that does not receive a paging channel (hereinafter referred to as a 'calling terminal') may be transmitted through another channel instead of the paging channel.

Alternatively, a paging channel (hereinafter referred to as a 'system paging channel') for transmission of the information indicating that the system information has been changed may be configured separately from the incoming paging channel. For example, scheduling information for the system paging channel may be configured differently from scheduling information for the incoming paging channel. The scheduling information may be a time-frequency resource, a scheduling identifier, configuration information of a control field in the scheduling information, and the like. Thus, the calling terminal may perform a monitoring operation on the system paging channel instead of the incoming paging channel.

Meanwhile, a downlink transmission request procedure based on the on-demand scheme (e.g., transmission request procedure of the system information) may be performed using an uplink resource (e.g., a resource configured for a random access procedure). The terminal may transmit an uplink signal (e.g., a preamble sequence, signaling information, control information, etc.) to the base station to trigger the downlink transmission request procedure. Here, the preamble sequence may indicate that the downlink transmission request procedure based on the on-demand scheme is to be started, and the uplink signal that triggers the downlink transmission request procedure may be a time-frequency resource selected by the terminal or a time-frequency resource configured by the base station.

Also, the preamble sequence used for the downlink transmission request procedure based on the on-demand scheme may be a preamble sequence that the terminal transmits first in the random access procedure or a preamble sequence configured for the system information transmission request procedure. The preamble sequence may be used for a request for transmission of minimum system information (e.g., essential system information), system information transmitted in a broadcast manner, system information for a specific area (e.g., beamforming unit, beamforming group unit), or the like. Here, the essential system information may be system information (e.g., MIB, SIB1, SIB2, etc.) including configuration information of physical layer resources. When transmission of the system information is requested using the preamble sequence according to the on-demand scheme, the preamble sequence (or, configuration information of a radio resource region of the corresponding preamble) may have a mapping relation with the requested system information. That is, a specific preamble sequence (or, configuration information of a radio resource region of the corresponding preamble, mask information of the corresponding preamble, etc.) may indicate a specific SIB, or may be configured to have a mapping relation with a specific SIB among SIBs constituting minimum system information or the system information. Here, the configuration information of the radio resource region of the preamble may include, as information indicating the location of an uplink radio resource for transmission of the preamble, information on a frequency axis such as bandwidth, subcarrier (group), etc., information on a time axis such as frame, subframe, slot, mini-slot, symbol, etc., beam configuration information according to a beamforming scheme, and the like.

Accordingly, the terminal may transmit a preamble by selecting a preamble sequence or a preamble radio resource region (e.g., a radio frame, a subframe, or a transmission band or subcarrier index) according to the mapping relation in consideration of a necessary SIB, and the base station (or, cell) may identify the SIB to be transmitted by the terminal using only information on the received preamble sequence or the radio resource region in which the preamble is received.

System information excluding the minimum system information (e.g., essential system information), the system information transmitted in a broadcast manner, and the system information for a specific area (e.g., beamforming unit, beamforming group unit) may be referred to as 'other system information'. Here, other system information may be transmitted over a data channel or a multicast channel. Further, other system information may be transmitted based on the on-demand scheme.

In the system information transmission request procedure based on the on-demand scheme, a bitmap indicating the system information requested to be transmitted may be used, and a unit of the system information requested to be transmitted may be a SIB unit or an SIB group unit. Here, the bitmap may include a bit sequence, each of the bits included in the bit sequence may be mapped to an SIB or an SIB group, and a value of each bit may indicate whether or not the corresponding system information is requested to be transmitted. For example, a specific bit set to 1 may indicate that transmission of a SIB (or SIB group) corresponding to the specific bit is requested.

Meanwhile, the transmission request procedure of the minimum system information may be performed based on an uplink resource used for transmission of a random access preamble in the random access procedure. For example, the terminal may transmit to the base station a message requesting transmission of the minimum system information using a resource allocated for the random access preamble in the random access procedure. The transmission request procedure of the other system information may be performed based on an uplink resource used for transmission of a message #3 (e.g., a message transmitted by the terminal after receiving a random access response) in the random access procedure. For example, the terminal may transmit to the base station a message requesting transmission of other system information using a resource allocated for the message #3 in the random access procedure.

The message requesting transmission of other system information may include transmission and reception beam related information. When the communications based on the beamforming scheme are performed between the base station and the terminal, the transmission and reception beam related information may include feedback information (e.g., beam configuration information, beam index, beam measurement result, antenna port, etc.) used for determining an optimal transmission beam and an optimal reception beams in terms of the base station, information on a transmission beam and a reception beam of the terminal, and the like.

Therefore, when the message requesting transmission of other system information is received from the terminal, the base station may identify the transmission and reception beam related information from the received message and determine an optimal beam based on the transmission and reception beam related information. The base station may transmit a message including the other system information, an optimal beam index, etc. to the terminal, and the terminal may acquire the other system information, the optimal beam index, and the like by receiving the corresponding message from the base station. In addition, when an index of a specific beam determined by the terminal is included in the transmission and reception beam related information, the base station may transmit the other system information to the terminal using a downlink beam indicated by the index of the specific beam.

Also, the base station may transmit the system information (e.g., minimum system information, other system information) to the terminal using a plurality of downlink beams. For example, the base station may transmit the same system information using a plurality of downlink beams at the same time. Also, the base station may transmit the system information using downlink beams at different times.

Meanwhile, in the system information transmission request procedure based on the on-demand scheme, the system information transmitted from the base station may be received at at least one terminal. When the system information is transmitted through a resource configured for a random access response, one terminal may receive the system information. In this case, a time interval between the resource configured for the random access preamble and the resource configured for the random access response may be maintained to be constant.

The base station may transmit the system information to the terminal in response to the transmission request of the system information. Alternatively, the base station may transmit scheduling information (e.g., information configured as a physical downlink control channel (PDCCH), information configured as a group common PDCCH) of the system information to the terminal in response to the transmission request of the system information. For example, when the message requesting transmission of the system information is received through the resource configured for the random access preamble, the base station may transmit the scheduling information of the system information through the resource configured for the random access response.

Here, the random access preamble may indicate that transmission of the system information is requested. A resource (e.g., a time-frequency resource, a preamble sequence, etc.) for the random access preamble indicating that transmission of the system information is requested may be configured equally to a resource for a random access preamble used for connection establishment. Alternatively, the resource for the random access preamble indicating that the transmission of the system information is requested may be configured differently from the resource for the random access preamble used for connection establishment.

Also, the base station may transmit a random access response including the scheduling information of the system information. The random access response may further include information indicating that the random access preamble indicating that transmission of system information is requested has been successfully received at the base station. Accordingly, when the information indicating that the random access preamble indicating that the transmission of the system information is requested has been successfully received at the base station does not exist in the random access response, the terminal may repeatedly transmit the random access preamble indicating that transmission of the system information is requested after a preconfigured time (e.g., timer) elapses. Here, the random access preamble may be repeatedly transmitted by a preconfigured maximum number of transmissions, repeatedly transmitted using different preamble sequences, and repeatedly transmitted through different resources. Further, when the beamforming scheme is used, the random access preamble may be repeatedly transmitted based on different beam configuration information (e.g., beam index).

Upon receipt of the random access preamble indicating that the transmission of the system information is requested, the base station may transmit scheduling information (e.g., information configured as a PDCCH, information configured as a group common PDCCH) by using a scheduling identifier (e.g., C-RNTI) corresponding to the corresponding system information or a scheduling identifier configured for the system information transmission request procedure based on the on-demand scheme, and may transmit the system information through a resource indicated by the scheduling information. The terminal may receive the scheduling information from the base station based on the scheduling identifier (e.g., group scheduling identifier). For example, the terminal may receive the scheduling information in a reception window for the random access response or in a reception window configured for the system information transmission request procedure based on the on-demand scheme. Here, the reception window may be configured in units of symbols, mini-slots, slots, subframes, TTIs, radio frames, microseconds, milliseconds, second, or the like. When the scheduling information is received, the terminal may receive the system information through the resource indicated by the scheduling information.

If the scheduling information (or, system information) is not received within the receiving window, the terminal may resume the system information transmission request procedure based on the on-demand scheme. Alternatively, the terminal operating in the RRC_idle state or the RRC_inactive state may transition to the RRC_connected state, and the terminal operating in the RRC_connected state may perform the system information transmission request procedure.

Meanwhile, when a terminal receives system information from the base station in the system information transmission request procedure based on the on-demand scheme, the terminal operating in the RRC_idle state or the RRC_inactive state may operate as follows.

The terminal operating in the RRC_idle state or the RRC_inactive state may transmit a random access preamble for requesting transmission of the system information to the base station, and after that, the terminal operating in the RRC_idle state or the RRC_inactive state may transition to the RRC_connected state. The terminal operating in the RRC_connected state may receive the system information (e.g., a random access response including the system information) from the base station through a unicast resource.

Alternatively, after the transmission of the random access preamble for requesting transmission of the system information, the terminal operating in the RRC_idle state or the RRC_inactive state may receive the system information (e.g., a random access response including the system information) from the base station through a resource indicated by separate scheduling information, a multicast resource, or a broadcast resource without transition to the RRC_connected state.

The base station may transmit a control message including information (e.g., scheduling information, information for downlink transmission, resource information) configured for transmission of the system information through a resource configured for the random access response or a resource configured for the system information transmission procedure based on the on-demand scheme. The control message may include control information of an RRC layer, a MAC layer or a physical layer, a control element, a control parameter, a control field, an indication bit (or a symbol), and the like.

For example, the control message may include scheduling information of a resource for a broadcast transmission, a multicast transmission, or a unicast transmission, or a scheduling identifier configured for scheduling the corresponding resource. Therefore, the terminal may identify the scheduling information included in the control message, or identifier the scheduling information based on the scheduling identifier. The terminal may receive the system information based on the identified scheduling information. Also, if the control message received from the base station does not instruct to transition to the RRC_connected state, the terminal may receive the system information in the RRC_idle state or the RRC_inactive state.

The scheduling information for a resource (e.g., a broadcast resource, a multicast resource, or a unicast resource) through which the system information is transmitted based on the on-demand scheme may include time resource information (e.g., interval, window, transmission period), frequency resource information (e.g., allocated band, subcarrier index), repetitive transmission related information, MCS information, beamforming related information (e.g., beam configuration information, beam index), and the like. Therefore, the base station may transmit the system information based on the scheduling information, and the terminal may receive the system information based on the scheduling information.

Meanwhile, when the system information is transmitted through a broadcast channel or a multicast channel, a plurality of terminals may receive the system information. The base station may semi-statically configure a transmission period and a radio resource for the system information to be transmitted through the broadcast channel, and may inform the terminals of the transmission period and the radio resource. The terminals may receive the system information based on the transmission period and the radio resource obtained from the base station. Also, when a transmission request of system information based on the on-demand scheme is received from the terminal within the transmission period of the broadcast channel, the base station may broadcast the system information (e.g., system information requested by the terminal) according to the corresponding transmission period. The system information may be transmitted through a data channel. Since scheduling information for the system information (e.g., scheduling information transmitted on the PDCCH) is transmitted based on a common scheduling identifier (e.g., SI-RNTI), all terminals may receive the system information.

The base station may semi-statically configure a transmission period and a radio resource for the system information to be transmitted through the multicast channel, and may inform the terminals of the transmission period and the radio resource. The terminals may receive the system information based on the transmission period and the radio resource obtained from the base station. Alternatively, the base station may dynamically configure the transmission period and the radio resource for the system information to be transmitted through the multicast channel, and transmit scheduling information for the system information by using a scheduling identifier for multicast transmission (e.g., system information multicast RNTI (SIMC-RNTI)). Therefore, the base station may receive the scheduling information based on the scheduling identifier configured for the system information transmission procedure based on the on-demand scheme, and receive the system information based on the scheduling information.

On the other hand, when the message requesting transmission of the system information based on the on-demand scheme is not received, the base station may not transmit the system information in the broadcast or multicast manner. Before transmitting the message requesting transmission of the system information based on the on-demand scheme, the terminal may identifier whether necessary system information (e.g., system information to be requested by the terminal based on the on-demand scheme) is transmitted or not by receiving control information the base station (e.g., scheduling information on the system information, scheduling identifier).

For example, when a response to a transmission request of system information of another terminal (e.g., scheduling information of system information, a scheduling identifier) is received from the base station, and the system information required by the terminal is determined to be transmitted from the base station within a predetermined time (e.g., window or timer) based on the response, the terminal may not transmit the message requesting the transmission of the system information based on the on-demand scheme. On the other hand, when the system information required by the terminal is determined not to be transmitted from the base station within the predetermined time (e.g., window or timer) based on the response, the terminal may transmit the message requesting the transmission of the system information based on the on-demand scheme. Therefore, the overhead due to the transmission of the message requesting the transmission of the system information based on the on-demand scheme may be reduced.

Meanwhile, in order to simplify the system information transmission procedure based on the on-demand scheme in the environment where cell coverages are overlapped, the base station may transmit system information of a neighboring base station (e.g., neighboring cell) to the terminal. For example, the terminal may transmit a message requesting transmission of system information based on the on-demand scheme. The base station may receive the message requesting the transmission of the system information based on the on-demand scheme from the terminal, and transmit its own system information and system information of a neighboring base station (e.g., neighboring cell) to the corresponding terminal, when the terminal moves between cell coverages or is located in an area where cell coverages are overlapped. The terminal may acquire the system information of the base station and the system information of the neighboring base station (e.g., neighboring cell) from the base station. The system information of each of the base stations may be distinguished by a cell identifier. When the terminal moves to the cell coverage of the neighboring base station, the terminal may identify the cell identifier of the neighboring base station based on the system information or the reference signal received from the neighboring base station, and may not perform the procedure of acquiring the system information from the neighbor base station when system information (e.g., system information of the neighboring base station obtained from the base station) corresponding to the cell identifier is present.

Random Access Procedure Based on Mapping Relation Between Resources

Next, a random access procedure based on a mapping relation between a downlink resource (e.g., a resource configured for synchronization signal burst transmission) and an uplink resource (e.g., a resource configured for a random access procedure) will be described.

Figure 14:
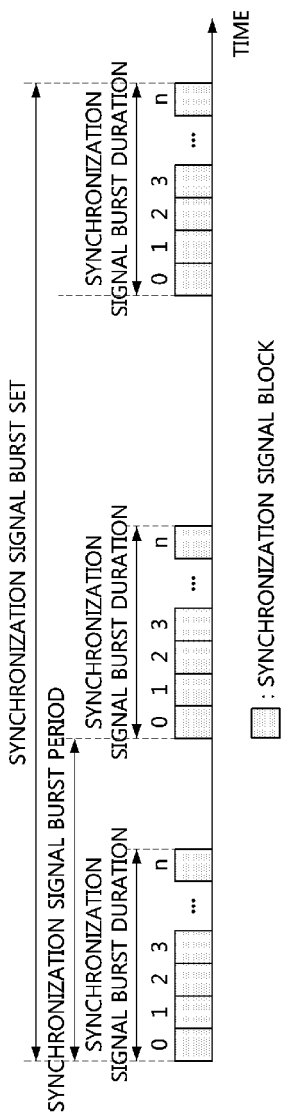
FIG. 14 is a timing chart illustrating a first embodiment of a method of transmitting a synchronization signal in a communication system.

FIG. 14 is a timing chart illustrating a first embodiment of a method of transmitting a synchronization signal in a communication system.

Referring to FIG. 14, a synchronization signal block may include a primary synchronization signal (PSS), a secondary synchronization signal (SSS), a PBCH, and the like. A synchronization signal burst may include synchronization signal blocks transmitted within a period of the synchronization signal burst. The base station may transmit the synchronization signal burst according to a preconfigured periodicity within a synchronization signal burst set. Here, n may be a positive integer. When the beamforming scheme is used, the base station may transmit the synchronization signal (e.g., synchronization signal block, synchronization signal burst) by using each of all beams in the synchronization signal burst set. Here, the synchronizing signal (e.g., synchronization signal block, synchronization signal burst) may be repeatedly transmitted in accordance with a preconfigured condition.

Meanwhile, when an uplink resource (e.g., a resource configured for a random access procedure) is mapped to a downlink resource (e.g., a resource configured for transmission of the synchronization signal burst), the random access preamble may be repeatedly transmitted through the uplink resource (e.g., common resource). For example, the common resource shared by a plurality of base stations may configure the synchronization signal burst set in a preconfigured frequency band or the same frequency band by using the same configuration parameters or configuration parameters to which a common rule is applied. The mapping relation may be established based on beams supported by the base station so that the terminal can repeatedly transmit the random access preamble. In this case, the terminal may repeatedly transmit the random access preamble without changing the preamble sequence (e.g., code sequence, bit sequence, or signal sequence) selected by the terminal until the end of the synchronization signal burst set (or, random access procedure).

Figure 15:
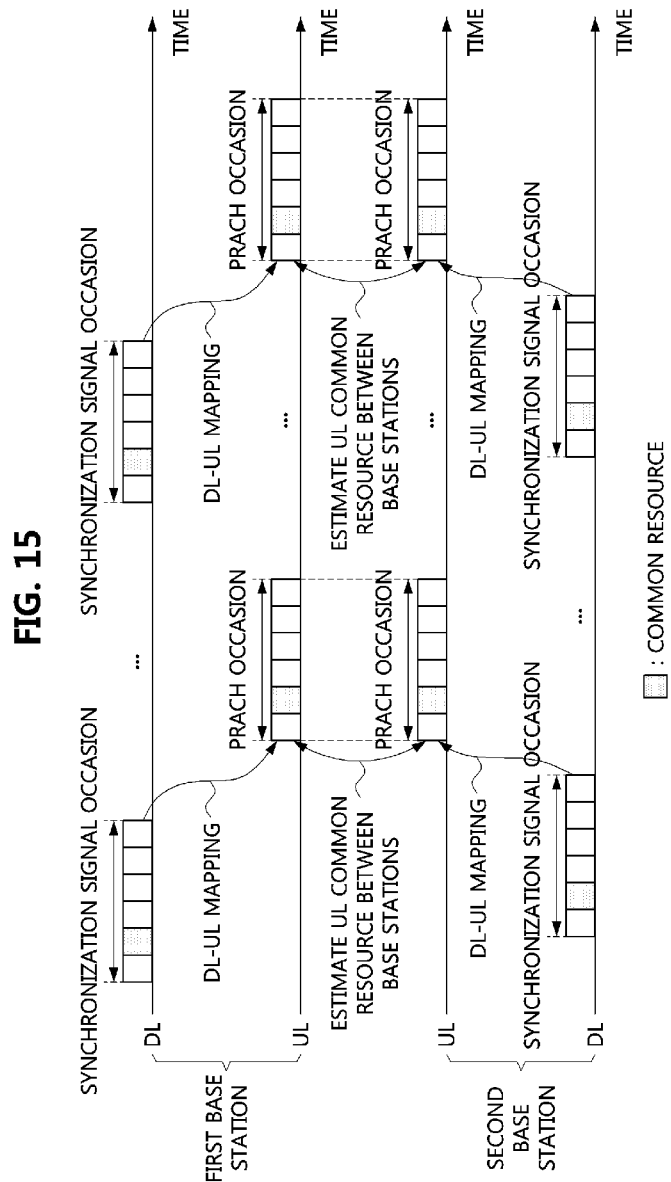
FIG. 15 is a conceptual diagram illustrating a mapping relation between resources in a communication system.

FIG. 15 is a conceptual diagram illustrating a mapping relation between resources in a communication system.

Referring to FIG. 15, a first base station and a second base station may operate in the FDD scheme. Each of the first base station and the second base station may be the same as the first base station 610-1 and the second base station 610-2 shown in FIG. 6. The common information for the first base station and the second base station may be configured, and the common information may include system information (e.g., minimum system information, essential system information) transmitted in a broadcast manner (or multicast manner), synchronization signal (e.g., synchronization signal block, synchronization signal burst), and the like. Also, the common information may include system information, control information, physical channel configuration/allocation information, reference signal configuration/allocation information, resource allocation information, and the like. The common information may be transmitted through a common resource configured for the first base station and the second base station.

A mapping relation between a downlink common resource of the first base station and an uplink common resource of the first base station may be configured. Therefore, the terminal, which knows the location of the downlink common resource of the first base station, may estimate the location of the uplink common resource of the first base station based on the mapping relation with the location of the downlink common resource of the first base station. A mapping relation between a downlink common resource of the second base station and an uplink common resource of the second base station may be configured. Therefore, the terminal, which knows the location of the downlink common resource of the second base station, may estimate the location of the uplink common resource of the second base station based on the mapping relation with the location of the downlink common resource of the second base station. Here, the downlink common resource may be used for transmission of the common information, and the uplink common resource may be used for a random access procedure, a scheduling request procedure, a downlink transmission request procedure, a system information request procedure, and the like. The mapping relation between the downlink common resource and the uplink common resource may be transmitted to the terminal through a signaling procedure using an RRC layer dedicated control message, a MAC control PDU, or the like, or through a system information transmission procedure.

Also, the uplink common resource may be shared by the first base station and the second base station, and the locations of the uplink common resources in the time axis may be equal in the first base station and the second base station. For example, a PRACH (e.g., PRACH occasion) of the first base station may be configured equally to a PRACH (e.g., PRACH occasion) of the second base station. Here, the fact that the PRACHs (e.g., PRACH allocations) of the base stations are configured to be the same may mean that the PRACHs are configured based on the same rule according to the absolute or relative scheme described above. Therefore, the terminal, which knows the location of the uplink common resource of the first base station, may estimate the location of the uplink common resource of the second base station based on the location of the uplink common resource of the first base station without performing a procedure of acquiring system information of the second base station, and transmit a random access preamble to the second base station using the uplink common resource of the second base station. Here, the location of the common resource may refer to information indicating a frequency band (e.g., bandwidth, subcarrier (group)), transmission time, transmission and reception beams, etc. of the resource. Therefore, the estimation of the location of the common resource may mean that the terminal obtains information on indication information of a transmission band (e.g., bandwidth) of an uplink PRACH resource through which the random access preamble can be transmitted, a transmission time index (e.g., frame, subframe, slot, mini-slot, symbol, or the like), a mask value, a preamble index range, a transmission beam index, and the like.

The communication procedure (e.g., the random access procedure, the system information transmission procedure, etc.) based on the common resource and the common information described above may be applied to the integrated communication system shown in FIGS. 4 and 5. For example, the XDU (or, XDU aggregator) may perform the communication procedure based on the common resource and the common information described above. That is, a plurality of XDUs (or, a plurality of XDU aggregators) may configure a common resource and may configuration information of the common resource. Also, a plurality of XDUs (or, a plurality of XDU aggregators) may configure common information and may transmit the common information through the common resource. Thus, an XDU having mobility may perform communications (e.g., the above-described operations of the terminal) by using the common resource and the common information configured by another XDU (or, another XDU aggregator).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a user equipment (UE) in a communication system, the operation method comprising:
    receiving, from a first base station, a bitmap whether to indicate that one or more system information blocks (SIBs) of the first base station are to be modified through a beamformed control channel;
    when the bitmap indicates that the one or more SIBs are to be modified, performing a monitoring operation to receive a SIB #1 including tags for SIB #2 to #n, a service area (SA) identifier indicating a service area to which same system information is applied, and configuration information of a bandwidth, n being an integer greater than or equal to 3;
    when the SIB #1 is received, identifying whether or not each of the SIB #2 to #n is modified based on the tags included in the SIB #1; and
    monitoring a channel to receive a modified SIB among the SIB #2 to #n,
    wherein one tag among the tags indicates whether one SIB among the SIB #2 to #n is modified, the same system information includes at least one of the SIB #1 to #n, the first base station belongs to the service area indicated by the SA identifier, and the same system information is applied to a second base station as well as the first base station when both the first base station and the second base station belong to a same service area which is the service area indicated by the SA identifier.

2. The operation method of claim 1, wherein the bitmap indicates validity of the one or more SIBs.

3. The operation method of claim 1, wherein the SIB #1 is minimum system information.

4. The operation method of claim 1, wherein a tag for a SIB #m among the SIB #2 to #n is information on validity for the SIB #m.

5. The operation method of claim 1, wherein the modified SIB is identified based on comparison of a tag included in the SIB #1 and a prior tag stored in the UE.

6. The operation method of claim 1, wherein the SIB #1 includes further information on a subcarrier spacing.

7. The operation method of claim 1, further comprises receiving, from the first base station, a master information block (MIB) including information on a subcarrier spacing.

8. An operation method of a first base station in a communication system, the operation method comprising:
    transmitting a bitmap whether to indicate that one or more system information blocks (SIBs) of the first base station are to be modified through a beamformed control channel;
    transmitting a SIB #1 including tags for SIB #2 to #n, a service area (SA) identifier indicating a service area to which same system information is applied, and configuration information of a bandwidth, n being an integer greater than or equal to 3; and
    transmitting a modified SIB among the SIB #2 to #n,
    wherein the modified SIB is identified using the tags included in the SIB #1, one tag among the tags indicates whether one SIB among the SIB #2 to #n is modified, the same system information includes at least one of the SIB #1 to #n, the first base station belongs to the service area indicated by the SA identifier, and the same system information is applied to a second base station as well as the first base station when both the first base station and the second base station belong to a same service area which is the service area indicated by the SA identifier.

9. The operation method of claim 8, wherein the bitmap indicates validity of the one or more SIBs.

10. The operation method of claim 8, wherein the SIB #1 is minimum system information.

11. The operation method of claim 8, wherein a tag for a SIB #m among the SIB #2 to #n is information on validity for the SIB #m.

12. The operation method of claim 8, wherein the modified SIB is identified based on comparison of a tag included in the SIB #1 and a prior tag stored in a user equipment (UE).

13. The operation method of claim 8, wherein the SIB #1 includes further information on a subcarrier spacing.

* * * * *